United States Patent
Kikuchi et al.

(10) Patent No.: US 12,247,146 B2
(45) Date of Patent: Mar. 11, 2025

(54) ADHESIVE TAPE AND METHOD OF PRODUCING THE SAME, AND ARTICLE USING THE ADHESIVE TAPE AND METHOD OF DISASSEMBLING THE SAME

(71) Applicant: DIC Corporation, Tokyo (JP)

(72) Inventors: Hiromasa Kikuchi, Saitama (JP); Hideaki Takei, Saitama (JP); Takeshi Iwasaki, Saitama (JP); Yusuke Takahasi, Tokyo (JP)

(73) Assignee: DIC Corporation, Tokyo (JP)

( * ) Notice: Subject to any disclaimer, the term of this patent is extended or adjusted under 35 U.S.C. 154(b) by 153 days.

(21) Appl. No.: 17/957,202

(22) Filed: Sep. 30, 2022

(65) Prior Publication Data

US 2023/0105502 A1 Apr. 6, 2023

(30) Foreign Application Priority Data

Oct. 5, 2021 (JP) ................................ 2021-164025

(51) Int. Cl.
 *C09J 7/26* (2018.01)
 *C09J 175/04* (2006.01)
(52) U.S. Cl.
 CPC .............. *C09J 7/26* (2018.01); *C09J 175/04* (2013.01); *C09J 2301/124* (2020.08); *C09J 2301/312* (2020.08); *C09J 2301/502* (2020.08); *C09J 2400/243* (2013.01)
(58) Field of Classification Search
 CPC ..... C09J 7/26; C09J 7/29; C09J 175/04; C09J 2301/124; C09J 2301/312; C09J 2301/502; C09J 2400/243; C09J 2203/326; C09J 2301/162; C08G 18/42; C08G 18/8029
 See application file for complete search history.

(56) References Cited

U.S. PATENT DOCUMENTS

| 2007/0059903 | A1* | 3/2007 | Yano | .................... | H01L 21/6835 |
| | | | | | 438/459 |
| 2012/0164414 | A1* | 6/2012 | Nakayama | .................. | C09J 7/26 |
| | | | | | 428/319.3 |
| 2016/0339672 | A1* | 11/2016 | Kagiyama | ................. | B32B 7/12 |
| 2019/0344310 | A1* | 11/2019 | Matsubara | ........... | C09D 175/04 |

FOREIGN PATENT DOCUMENTS

| JP | 2010-155969 A | 7/2010 |
| WO | 2015/098494 A1 | 7/2015 |
| WO | WO-2020155153 A1 * | 8/2020 ............. C08G 18/42 |

* cited by examiner

*Primary Examiner* — Scott R. Walshon

(74) *Attorney, Agent, or Firm* — Osha Bergman Watanabe & Burton LLP

(57) ABSTRACT

A double-sided adhesive tape is provided for bonding two or more adherends. The double-sided adhesive tape has satisfactory rollability, excellent reworkability after cleavage, and excellent shear holding characteristics at high temperatures. The double-sided adhesive tape includes a foam base, a resin layer (A1) disposed in direct contact with one surface of the foam base, an adhesive layer (B1) disposed on A1 on a side opposite to the foam base, a resin layer (A2) disposed in direct contact with another surface of the foam base, and an adhesive layer (B2) disposed on A2 on a side opposite to the foam base. A1 and A2 are each formed of a crosslinked product of a composition containing a resin having a hydroxy group and a compound reacting with the hydroxy group, and the tensile modulus of each of A1 and A2 is 50 MPa or more and 1000 MPa or less.

8 Claims, 3 Drawing Sheets (1)

(2)

ADHESIVE TAPE AND METHOD OF PRODUCING THE SAME, AND ARTICLE USING THE ADHESIVE TAPE AND METHOD OF DISASSEMBLING THE SAME

TECHNICAL FIELD

One or more embodiments of the present invention relate to a double-sided adhesive tape having a foam base.

BACKGROUND

Double-sided adhesive tapes have been widely used, for example, in situations where parts of articles such as electronic devices are fixed together. In electronic devices and the like, in particular, there is a demand for double-sided adhesive tapes that are thin and have excellent conformability to adherends and impact resistance. As such a double-sided adhesive tape, for example, Japanese Unexamined Patent Application Publication No. 2010-155969 discloses a double-sided adhesive tape having adhesive layers on both sides of a flexible foam base.

With the recent trend toward thinner and more sophisticated electronic devices, thin and expensive parts made of rigid materials, such as protective panels, image display modules, and touch panels for image displays, and thin batteries are often used as parts in electronic devices. It is desirable that such expensive parts can be easily separated from the main bodies (housings) of electronic devices, for example, when a failure occurs in the electronic devices or when the electronic devices are discarded, and that the main bodies of the electronic device and the removed parts can be reused. The double-sided adhesive tape used to fix parts is required not only to have conformability to the adherend and impact resistance but also to be easily peeled off from the adherend during reworking and not to be torn and left on the adherend.

As such a double-sided adhesive tape, for example, WO2015/098494 discloses a double-sided adhesive tape in which resin films are laminated on the surfaces of a foam base and adhesive layers are provided on both sides of the foam base with the resin films interposed. In the double-sided adhesive tape disclosed in WO2015/098494, when an article made of two or more adherends fixed with the above double-sided adhesive tape is disassembled, the article can be easily disassembled by causing interlaminar fracture (cleavage) in the foam base. When the cleaved double-sided adhesive tape left on the surface of each adherend after disassembly is peeled off, the resin film functions as a support to allow the double-sided adhesive tape to be peeled off and removed from the adherend.

A double-sided adhesive tape with a resin film interposed between a foam base and an adhesive layer is usually wrapped into a roll and unwrapped from the roll in use, but the presence of the resin film makes it difficult to roll up and tends to cause wrinkling of the roll. On the other hand, if the rollability (also called ease of rolling) of the double-sided adhesive tape is increased, inconvenience is likely to occur in peeling off the tape, especially in peeling off the cleaved tape from the adherend after disassembling the article as described above. For example, it is difficult to pick up the edge to make a trigger to peel, the double-sided adhesive tape is easily torn during peeling, and glue is left on the adherend, so that the reworkability is deteriorated.

Furthermore, articles using double-sided adhesive tapes may be used in high-temperature environments, and, especially in electronic devices, the articles themselves may heat and reach high temperatures. In conventional double-sided adhesive tapes in which the foam base and the resin films are bonded together by thermal lamination or a bonding agent, exposure to high temperatures causes delamination between the foam base and the resin film or between the adhesive layer and the resin film, or causes cohesive fracture of the resin film, and shear holding characteristics at high temperatures are poor.

SUMMARY

One or more embodiments of the present invention are made in view of the above circumstances and provides a double-sided adhesive tape that can be used for bonding two or more adherends, has satisfactory rollability and excellent reworkability (especially reworkability after cleavage), and has excellent shear holding characteristics at high temperatures, and a method of producing the same, and an article using the double-sided adhesive tape and a method of disassembling the same.

One or more embodiments of the present invention provide a double-sided adhesive tape including a foam base, a resin layer (A1) disposed in direct contact with one surface of the foam base, an adhesive layer (B1) disposed on the resin layer (A1) on a side opposite to the foam base, a resin layer (A2) disposed in direct contact with another surface of the foam base, and an adhesive layer (B2) disposed on the resin layer (A2) on a side opposite to the foam base, in which the resin layer (A1) and the resin layer (A2) are each formed of a crosslinked product of a composition containing a resin having a hydroxy group and a compound reacting with the hydroxy group, and the tensile modulus of each of the resin layer (A1) and the resin layer (A2) is 50 MPa or more and 1000 MPa or less.

One or more embodiments of the present invention also provide a method of producing the double-sided adhesive tape described above. The method includes: a precursor layer (a1) forming step of providing a precursor layer (a1) formed of a composition containing a resin having a hydroxy group and a compound reacting with the hydroxy group directly on one surface of a foam base; a precursor layer (a2) forming step of providing a precursor layer (a2) formed of a composition containing a resin having a hydroxy group and a compound reacting with the hydroxy group directly on another surface of the foam base; and a reaction step of crosslinking the precursor layer (a1) and the precursor layer (a2) provided on both surfaces of the foam base to form a resin layer (A1) and a resin layer (A2), respectively.

One or more embodiments of the present invention also provide an article having two or more adherends joined by the double-sided adhesive tape.

One or more embodiments of the present invention also provide a method of disassembling an article having two or more adherends joined by the double-sided adhesive tape. The method includes: cleaving the double-sided adhesive tape at the foam base to separate the article into a first adherend including a first laminate having a portion of the foam base, the resin layer (A1), and the adhesive layer (B1), and a second adherend including a second laminate having a portion of the foam base, the resin layer (A2), and the adhesive layer (B2); peeling the first laminate from the first adherend; and peeling the second laminate from the second adherend.

Advantageous Effects of Invention

One or more embodiments of the present invention provide a double-sided adhesive tape that has satisfactory rollability, exhibits excellent reworkability, such as easily picking up the edge to make a trigger to peel, being less likely to be torn during peeling, and being less likely to leave glue residue on the adherend after peeling when the double-sided adhesive tape is peeled off from the adherend after cleavage, and has excellent shear holding characteristics at high temperatures, and a method of producing the double-sided adhesive tape, and an article using the double-sided adhesive tape and a method of disassembling the article.

DETAILED DESCRIPTION OF THE EMBODIMENTS

In the following, one or more embodiments of the present invention (referred to herein as "one or more embodiments") will be described in detail. However, one or more embodiments of the present invention is not limited to one or more embodiments.

I. Double-Sided Adhesive Tape

A double-sided adhesive tape of one or more embodiments include a foam base, a resin layer (A1) disposed in direct contact with one surface of the foam base, an adhesive layer (B1) disposed on the resin layer (A1) on a side opposite to the foam base, a resin layer (A2) disposed in direct contact with the other surface of the foam base, and an adhesive layer (B2) disposed on the resin layer (A2) on a side opposite to the foam base, in which the resin layer (A1) and the resin layer (A2) are each formed of a cross-linked product of a composition containing a resin having a hydroxy group and a compound reacting with the hydroxy group, and the tensile modulus of each of the resin layer (A1) and the resin layer (A2) is 50 MPa or more and 1000 MPa or less. In the following description, the resin having a hydroxy group that forms the resin layer may be referred to as "resin (I)" and the compound reacting with the hydroxy group may be referred to as "compound (I)".

Figure 1:
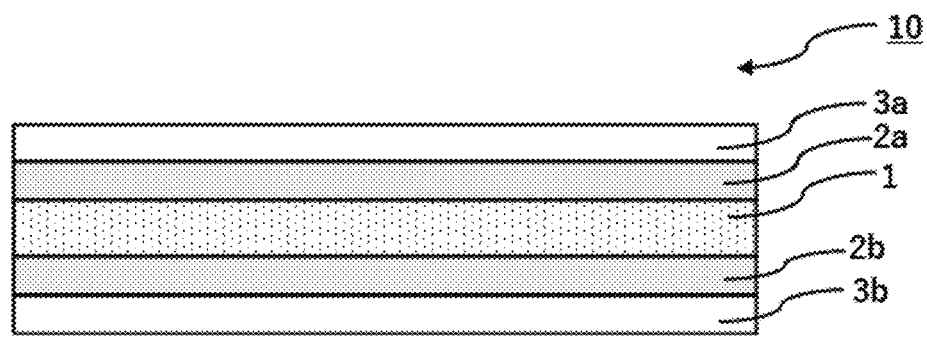
FIG. 1 is a schematic cross-sectional view of an example of a double-sided adhesive tape according to one or more embodiments of the present invention.

FIG. 1 is a schematic cross-sectional view of an example of a double-sided adhesive tape of one or more embodiments. In a double-sided adhesive tape 10 of one or more embodiments illustrated in FIG. 1, resin layers (A1) and (A2) (reference signs 2a and 2b in FIG. 1) are directly provided on both surfaces of a foam base 1, and adhesive layers (B1) and (B2) (reference signs 3a and 3b in FIG. 1) are provided on the surfaces of the resin layers (A1) and (A2), respectively, on the sides opposite to the foam base 1. The resin layers (A1) and (A2) are each formed of a crosslinked product of a composition containing a resin having a hydroxy group and a compound reacting with the hydroxy group and exhibit a tensile modulus in a predetermined range.

In the double-sided adhesive tape of one or more embodiments, since the resin layers (A1) and (A2) provided on both surfaces of the foam base are each formed of a crosslinked product of a composition containing a resin having a hydroxy group and a compound reacting with the hydroxy group and have a tensile modulus in a predetermined range, excellent rollability, reworkability (especially the reworkability after the tape is cleaved at the foam base), and shear holding characteristics at high temperatures can be achieved.

More specifically, the double-sided adhesive tape requires stretchability to achieve satisfactory rollability. If the stretchability is too high and the toughness is poor, it is difficult to pick up the edge of the tape to make a trigger to peel when the tape is peeled off from the adherend, thereby reducing the peeling workability. In addition, the tape is easily torn during peeling or glue residue tends to be left. On the other hand, the double-sided adhesive tape that exhibits toughness can have satisfactory reworkability because the edge of the tape is easily picked up in peeling, and the tape is less likely to be torn during peeling or glue residue is less likely to be left on the adherend. However, if the toughness is too high, it is difficult to roll up the double-sided adhesive tape and wrinkles appear during rolling, thereby reducing the rollability. If the toughness is too high, the double-sided adhesive tape may be easily torn during peeling.

By contrast, in one or more embodiments, the resin layers (A1) and (A2) exhibiting predetermined physical properties are provided on both surfaces of the foam base, so that both of the toughness that makes the edge of tape easily picked up and makes the tape less likely to be torn during peeling when the tape is peeled off from the adherend and the stretchability that makes satisfactory rollability can be achieved, thereby achieving satisfactory reworkability and rollability. In particular, in disassembly of an article having two or more adherends joined by the double-sided adhesive tape, when the article is disassembled by cleaving the double-sided adhesive tape at the foam base and subsequently a portion of the cleaved double-sided adhesive tape left on each adherend (which hereinafter may be referred to as "laminate") is removed, the laminate is thin so that it is more difficult to pick up the edge and the tape is torn more easily, further reducing the reworkability. By contrast, in the double-sided adhesive tape of one or more embodiments, even if the laminate that is a part of the double-sided adhesive tape is left on each adherend as a result of cleavage, the resin layer allows the edge to be easily picked up and provide a trigger to peel, despite the thin laminate, because the laminate has the resin layer exhibiting a tensile modulus in a predetermined range. In addition, the tape is less likely to be torn during peeling and can be easily peeled off from each adherend. In this way, the double-sided adhesive tape of one or more embodiments can exhibit excellent reworkability after cleavage.

In the double-sided adhesive tape of one or more embodiments, the resin layers (A1) and (A2) are each disposed in direct contact with the surface of the foam base. Here, the resin layers (A1) and (A2) are layers with high heat resistance because they are formed of a crosslinked product having crosslinking bonds formed by a reaction of hydroxy groups that are cross-linkable functional groups in the resin (I) and functional groups of the compound (I). In addition, some of the hydroxy groups and the functional groups in the resin layers (A1) and (A2) react with the functional groups present in the foam base and the adhesive layer in contact with the resin layer to form bonds between the resin layers (A1) and (A2) and the foam base, as well as between the resin layer (A1) and the adhesive layer (B1) and between the resin layer (A2) and the adhesive layer (B2), so that high interlaminar strength can be achieved. Thus, in the double-sided adhesive tape of one or more embodiments, degradation of the resin layer due to exposure to high temperatures and delamination between the resin layer and the foam base and/or the adhesive layer can be suppressed, and excellent shear holding characteristics can be exhibited even at high temperatures.

In the description herein, acrylic and methacrylic are collectively referred to as (meth)acrylic. Acrylate and methacrylate are collectively referred to as (meth)acrylate.

1. Resin Layer (A1) and Resin Layer (A2)

The resin layers (A1) and (A2) in one or more embodiments are disposed in direct contact with one surface and the other surface of the foam base, respectively, and have a predetermined composition and physical properties. One surface and the other surface of the foam base refer to two main surfaces opposed to each other in the thickness direction of the double-sided adhesive tape of one or more embodiments. In the present description, the resin layer (A1) and the resin layer (A2) may be collectively referred to as "resin layer".

The resin layer in one or more embodiments has the function of increasing toughness without impairing the stretchability of the double-sided adhesive tape of one or more embodiments. When an article having two or more adherends joined by the double-sided adhesive tape is disassembled, the resin layer functions as a support in removing a portion of the double-sided adhesive tape (laminate) left on the surface of each adherend separated by cleavage of the double-sided adhesive tape. More specifically, when the article is disassembled by cleaving the double-sided adhesive tape at the foam base and subsequently a portion of the cleaved double-sided adhesive tape (laminate) left on the adherend is removed from each adherend, the edge of the laminate, specifically, the resin layer is picked up and pulled, whereby the laminate can be easily removed from the surface of each adherend.

(1) Composition

The resin layer (A1) and the resin layer (A2) are formed of a crosslinked product of a composition containing a resin having a hydroxy group and a compound reacting with the hydroxy group. The resin layer and the crosslinked product that forms the resin layer contains a crosslinked structure of the resin having a hydroxy group and the compound reacting with the hydroxy group as a main component, and may contain any uncross-linked components in addition to the crosslinked structure of the resin having a hydroxy group and the compound reacting with the hydroxy group. The wording "the crosslinked product that forms the resin layer contains a crosslinked structure of the resin having a hydroxy group and the compound reacting with the hydroxy group as a main component" means that the resin layer contains the crosslinked structure of the resin having a hydroxy group and the compound reacting with the hydroxy group most abundantly. Specifically, the resin layer may contain 50% or more of the crosslinked structure of the resin having a hydroxy group and the compound reacting with the hydroxy group, may contain 70% or more, or may contain 90% or more.

[Resin Having Hydroxy Group]

The resin having a hydroxy group (hereinafter may be referred to as resin (I)) has at least one hydroxy group in one molecule. Among those, the resin having a hydroxy group may have two or more hydroxy groups in one molecule or may have three or more hydroxy groups in one molecule. The position of the hydroxy group in the resin (I) is not limited, and the hydroxy group may be at a terminal of the molecular chain, may be inside the molecular chain, or may be both at a terminal and inside the molecular chain, but preferably at least at a terminal of the molecular chain.

Examples of the resin having a hydroxy group include polyol resins that contain resin backbones derived from polyester resin, acrylic resin, polyurethane resin, olefin resin, epoxy resin, polyether resin, polycarbonate resin, polyamide resin, styrene resin, and the like as the main backbone and have a hydroxy group. These resins may be used singly or in combination of two or more. The resin having a hydroxy group has a structure in which a hydroxy group is introduced into the resin backbone selected from the above group. The resin having a hydroxy group may be linear or branched.

Among those, in terms of coatability and film formability, it is preferable that the resin having a hydroxy group is a resin having a backbone selected from the group consisting of a polyester backbone, an acrylic backbone, and a urethane backbone as the main backbone, in other words, a polyol resin selected from the group consisting of a polyester resin having a hydroxy group, an acrylic resin having a hydroxy group, and a urethane resin having a hydroxy group. A polyester resin having a hydroxy group is more preferred because if so, a predetermined modulus of the resin layer is easily ensured, the solubility in a solvent is excellent in forming a film of the resin layer, and the film formation by coating is easy.

The polyester resin having a hydroxy group is a resin that has a polyester backbone as the main backbone and has a hydroxy group introduced. Among those, the polyester resin having a hydroxy group may be a resin that has a polyester backbone as the main backbone and has a hydroxy group introduced at a terminal, that is, a polyester resin having a hydroxy group at a terminal. The polyester resin having a hydroxy group is obtained by a copolymerization reaction of at least a polybasic acid such as polycarboxylic acid and a polyhydric alcohol (polyol) or a derivative thereof, and has an ester bond formed by an esterification reaction of polybasic acid and polyhydric alcohol in the main chain. The polyester resin having a hydroxy group can also be obtained by a polycondensation reaction with polyhydric alcohol as well as an addition reaction and/or a transesterification reaction, using an ester-forming derivative such as a polybasic acid anhydride and a polybasic acid lower alkyl ester, in place of the polybasic acid.

An example of the polyester resin having a hydroxy group is a polyester resin obtained by allowing at least polycarboxylic acid and polyhydric alcohol to react. The polycarboxylic acid may be any compound having two or more carboxylic acid functional groups (—COOH), and examples include aromatic polycarboxylic acids such as terephthalic acid, isophthalic acid, orthophthalic acid, and naphthalenedicarboxylic acid, diphenyl-4,4'-dicarboxylic acid, diphenoxyethanedicarboxylic acid, diphenyl-3,3'-dicarboxylic acid, diphenyl-4,4'-dicarboxylic acid, and anthracenedicarboxylic acid; alicyclic dicarboxylic acids such as 1,2-cyclohexanedicarboxylic acid, 1,3-cyclohexanedicarboxylic acid, and 1,4-cyclohexanedicarboxylic acid; aliphatic polycarboxylic acids such as malonic acid, succinic acid, glutaric acid, adipic acid, pimelic acid, suberic acid, fumaric acid, suberic acid, azelaic acid, sebacic acid, 1,10-decamethylenedicarboxylic acid; and ester-forming derivatives thereof. One or more of these can be used as the carboxylic acid. Among those, in terms of increasing the toughness of the resin layer, it is preferable to use one or more aromatic polycarboxylic acids, and it is more preferable to use one or more aromatic dicarboxylic acids such as terephthalic acid and isophthalic acid.

The polyhydric alcohol may be any compound that has two or more hydroxy groups (—OH groups), and examples include aliphatic polyhydric alcohols such as ethylene glycol, diethylene glycol, trimethylene glycol, tetramethylene glycol, neopentyl glycol, polyethylene glycol, 1,2 propanediol, 1,3-propanediol, propylene glycol, 1,2-butanediol, 1,3-butanediol, 1,4-butanediol, 1,5-pentanediol, 1,6-hexanediol, 1,w-heptanediol, 1,7-heptanediol, 1,10-decanediol, neopentyl glycol, decamethylene glycol, 3-methyl-1,5-pentanediol, 2-methyl-1,3-propanediol, 1,2-cyclohexanediol, 1,4-cyclohexanediol, 1,4-cyclohexane dimethanol, 2,2,4,4'-tetramethyl-1,3-cyclobutanediol, glycerin, and trimethylolpropane; aromatic polyhydric alcohols such as xylene glycol, 4,4'-dihydroxybiphenyl, 2,2-bis(4-hydroxyphenyl)propane, bis(4-hydroxyphenyl)sulfone, bisphenol A, and alkylene oxide adduct of bisphenol A; and ester-forming derivatives thereof. One or more of these can be used as the polyhydric alcohol. Among those, in terms of increasing the toughness of the resin layer, it is preferable to use one or more aliphatic polyhydric alcohols, and it is more preferable to use one or more aliphatic dialcohols with C2 or C3 straight chains, such as ethylene glycol, neopentyl glycol, and propylene glycol.

A preferred method of introducing a hydroxy group into the polyester resin is, for example, performing synthesis so that a hydroxy group is located at a molecular terminal. It is preferable that a hydroxy group may be introduced to a molecular terminal, but a hydroxy group may be introduced inside the terminal resin chain. When a hydroxy group is introduced inside the terminal resin chain, a compound having a hydroxy group and a carboxy group and having a total of three or more of these groups, such as a dihydroxycarboxylic acid compound or a monohydroxydicarboxylic acid compound, may be used as one component of the polybasic acid component or the polyhydric alcohol component. As another method, a polyester polyol may be synthesized by a known method, and a carboxy group may be introduced by allowing some hydroxy groups of the polyester polyol to react with acid anhydride. Examples of the acid anhydride include phthalic anhydride, tetrahydro phthalic anhydride, hexahydro phthalic anhydride, maleic anhydride, trimellitic anhydride, and pyromellitic anhydride. Yet another method is ring-opening addition polymerization of lactones to a polyhydroxycarboxylic acid compound.

The polyester resin having a hydroxy group may be crystalline or non-crystalline, but preferably non-crystalline. This is because when the resin layer is formed of a crosslinked product of a composition containing a non-crystalline polyester resin having a hydroxy group and a compound reacting with the hydroxy group, elongation and toughness can be further increased compared with when a crystalline polyester resin is used. Another reason is that when the composition used to form a precursor layer, which is the form before crosslinking of the resin layer, in producing the double-sided adhesive tape of one or more embodiments contains at least a non-crystalline polyester resin having a hydroxy group, the coatability of the composition is satisfactory, and the film formation of the resin layer having a predetermined tensile modulus is easy.

A commercially available product can be used as the polyester resin having a hydroxy group. Examples of the commercially available product include "Nichigo-POLYESTER" series from Mitsubishi Chemical Corporation, "VYLON" series from TOYOBO CO., LTD., and "elitel" series from UNITIKA LTD.

The acrylic resin having a hydroxy group is a resin having a (meth)acrylic backbone as the main backbone and having a hydroxy group introduced. Among those, a resin having a (meth)acrylic backbone as the main backbone and having a hydroxy group introduced at a terminal, that is, an acrylic resin having a hydroxy group at a terminal is preferred. Such an acrylic resin having a hydroxy group can be obtained, for example, by copolymerizing at least a (meth)acrylic ester with a hydroxy group-containing (meth)acrylic monomer and/or a carboxylate group-containing acrylic monomer as essential components.

Examples of the (meth)acrylic ester used in preparation of the acrylic resin having a hydroxy group include methyl (meth)acrylate, ethyl (meth)acrylate, propyl (meth)acrylate, isopropyl (meth)acrylate, butyl (meth)acrylate, isobutyl (meth)acrylate, tert-butyl (meth)acrylate, lauryl (meth)acrylate, stearyl (meth)acrylate, 2-ethylhexyl (meth)acrylate, cyclohexyl (meth)acrylate, methylcyclohexyl (meth)acrylate, cyclododecyl (meth)acrylate, and isobornyl (meth) acrylate.

Examples of the hydroxy group-containing acrylic monomer used in preparation of the acrylic resin having a hydroxy group include hydroxyethyl (meth)acrylate, hydroxypropyl (meth)acrylate, and hydroxybutyl (meth)acrylate. Examples of the carboxylate group-containing acrylic monomer include (meth)acrylic esters as an essential component, and (meth)acrylic acid, itaconic acid, maleic anhydride, if necessary.

The acrylic resin having a hydroxy group may be an acrylic resin polymerized with a small amount of polymerizable monomer containing 2 to 6 (meth)acryloyl groups, such as ethylene glycol di(meth)acrylate, trimethylolpropane tri(meth)acrylate, and hexa(meth)acrylate, in addition to the monomers described above.

Examples of the acrylic resin having a hydroxy group include "ACRYDIC" series from DIC Corporation and "ACRIT" series from TAISEI FINE CHEMICAL CO. LTD. Examples of commercially available acrylic resins include product names: ACRYDIC A-808-T and ACRYDIC 57-451 from DIC Corporation.

The polyurethane resin having a hydroxy group is a resin having a urethane backbone as the main backbone and having a hydroxy group introduced. Among those, a resin having a urethane backbone as the main backbone and having a hydroxy group introduced at a terminal, that is, a urethane resin having a hydroxy group at a terminal is preferred. The polyurethane resin having a hydroxy group is obtained, for example, by allowing a polyisocyanate compound to react with a compound having at least two hydroxy groups in one molecule at a ratio such that hydroxy groups are in excess of isocyanate groups.

Examples of the polyisocyanate compound used in preparation of the polyurethane resin having a hydroxy group include hexamethylene diisocyanate, toluene diisocyanate, m-xylylene diisocyanate, and isophorone diisocyanate. Examples of the compound having at least two hydroxy groups in one molecule include the above polyhydric alcohols, polyester diols, polyethylene glycol, polypropylene glycol, and polycarbonate diols.

A polyolefin resin having a hydroxy group can also be used and, for example, UNISTOLE series can be used.

The resin having a hydroxy group may have a glass transition temperature in the range of −20° C. to 50° C. Among those, a glass transition temperature in the range of −10° C. to 40° C. is preferred, and a glass transition temperature in the range of 0° C. to 30° C. is further preferred. When the resin having a hydroxy group has a glass transition temperature in the above range, reworkability, rollability, and interlayer adhesiveness can be easily achieved at the same time. If the glass transition temperature of the resin having a hydroxy group is too high, it is difficult to achieve rollability and interlayer adhesiveness, and if the glass transition temperature is too low, it is difficult to achieve reworkability.

The glass transition temperature of the resin having a hydroxy group is the value measured by the differential scanning calorimetry (DSC) method. More specifically, using a differential scanning calorimetry system (DSC-7000 from SII Nano Technology Inc., hereinafter referred to as DSC), 5 mg of a sample is heated from room temperature to 200° C. at 10° C./min under a nitrogen flow at 30 mL/min and then cooled to −80° C. at 10° C./min. The temperature is increased again to 150° C. at 10° C./min, and the DSC curve is determined. The intersection of the straight line obtained by extending the baseline on the low temperature side to the high temperature side in the measurement results observed in the second temperature increase process and the tangent line drawn at the point where the slope of the curve in the step-like portion of glass transition is maximum is defined as the glass transition point. The temperature at this point is the glass transition temperature.

The resin having a hydroxy group may have a hydroxy group value of 1 mg KOH/g or more and 30 mg KOH/g or less. Among those, 1.5 mg KOH/g or more and 20 mg KOH/g or less is preferred, and 2 mg KOH/g or more and 10 mg KOH/g or less is more preferred. This is because when the hydroxy group value is in the above range, the resin layer achieves both of the strength and hardness and the flexibility, achieves satisfactory rollability and reworkability, and also achieves shear holding characteristics at high temperatures. If the hydroxy group value is below the above range, inconvenience may occur in making coatings and/or coatability of the resin layer-forming composition when the resin layer is formed by coating. If the hydroxy group value exceeds the above range, inconvenience in rollability and/or inconvenience of tearing in reworking may occur. The hydroxy group value of the resin having a hydroxy group is the value obtained from neutralization titration by the acetic anhydride/pyridine method based on JIS K0070.

The resin having a hydroxy group may have a number average molecular weight in the range of 1000 to 200000. Among those, the number average molecular weight in the range of 2000 to 100000 is more preferred, and the number average molecular weight in the range of 4000 to 50000 is particularly preferred. This is because when the resin having a hydroxy group has a number average molecular weight in the above range, the resin layer can achieve both toughness and flexibility and achieve satisfactory reworkability and rollability, and the resin layer can have a higher glass transition temperature.

The number average molecular weight of the resin having a hydroxy group is the value measured by gel permeation chromatography (GPC) under the following conditions.

Measurement Conditions
  Measuring system: HLC-8320GPC from Tosoh Corporation
  Columns: TSKgel 4000HXL, TSKgel 3000HXL, TSKgel 2000HXL, TSKgel 1000HXL from Tosoh Corporation
  Detector: RI (differential refractometer)
  Data processing: multi-station GPC-8020 model II from Tosoh Corporation
  Measurement conditions: column temperature 40° C.
  Developing Solvent Tetrahydrofuran
    Flow rate 0.35 mL/min
    Standard: monodisperse polystyrene
    Sample: 0.2% by mass of tetrahydrofuran solution in terms of resin solids, filtered through a microfilter (100 μl)

Compound Reacting with Hydroxy Group

The compound reacting with the hydroxy group (which hereinafter may be referred to as compound (I)) is a compound that reacts with the hydroxy group that is a cross-linkable functional group in the resin (I), and a compound that forms a crosslinking bond with the hydroxy group in the resin (I) and thus functions as a crosslinking agent.

The compound reacting with the hydroxy group may have two or more functional groups reacting with the hydroxy group in one molecule, and may have three or more. Examples of such a compound reacting with the hydroxy group include polyisocyanate compounds, amino compounds, epoxy compounds, and dialdehyde. These compounds can be used singly or in combination of two or more. Among those, the compound reacting with the hydroxy group may be a polyisocyanate compound. The isocyanate group of the polyisocyanate compound can easily form cross-linkage with the resin having a hydroxy group to improve the physical properties of the resin layer because of the crosslinked structure, and can also react with functional groups in the foam base and the adhesive layer to form cross-linkage between the layers, thereby increasing the interlaminar strength between the resin layer and the foam base and/or the adhesive layer.

The polyisocyanate compound has two or more isocyanate groups in one molecule and, among those, may have three or more isocyanate groups. In other words, any polyisocyanate compound with two or more functionalities can be used, and a polyisocyanate compound with three or more functionalities is preferred. In the process of film formation of the precursor layer, which is the form before crosslinking of the resin layer, the progress of the crosslinking reaction with the resin having a hydroxy group in a short time can be suppressed, the crosslinking reaction of the precursor layer can proceed in contact with the foam base and the adhesive layer, and the resin layer having desired physical properties can be formed. In addition, the interlayer adhesiveness with the foam base and the adhesive layer can be increased. The upper limit of the number of isocyanate groups (the number of functionalities) of the polyisocyanate compound is not limited, but generally six or less is preferred.

As such a polyisocyanate compound, for example, a compound with multiple isocyanate groups bonded to a basic structure such as aliphatic chain hydrocarbon, alicyclic hydrocarbon, or aromatic hydrocarbon can be used. Specifically, examples include derivatives (modified products) of polyisocyanates, such as aromatic polyisocyanates such as 4,4'-diphenylmethane diisocyanate (MDI), polymethylene polyphenylene polyisocyanate, polytolylene polyisocyanate, tolylene diisocyanate (TDI), xylylene diisocyanate (XDI), metaxylylene diisocyanate (MXDI), and naphthalene diisocyanate (NDI); aliphatic polyisocyanates such as hexamethylene diisocyanate (HDI), tetramethylene diisocyanate, 2-methyl-pentane-1,5-diisocyanate, 3-methyl-pentane-1,5-diisocyanate, lysine diisocyanate, and trioxyethylene diisocyanate; alicyclic polyisocyanates such as isophorone diisocyanate (IPDI), cyclohexyl diisocyanate, 4,4'-dicyclohexylmethane diisocyanate, norbornane diisocyanate, hydrogenated tolylene diisocyanate, hydrogenated xylene diisocyanate, and hydrogenated tetramethylxylene diisocyanate; and carbodiimide-modified polyisocyanates of these polyisocyanates, isocyanurates of these polyisocyanates, adducts of these polyisocyanates, biurets of these polyisocyanates, and adducts of these polyisocyanates with polyols. More specific examples of the derivatives (modified products) of polyisocyanates include trimethylolpropane/tolylene diisocyanate trimer adducts, trimethylolpropane/hexamethylene diisocyanate trimer adducts, isocyanurates of hexamethylene diisocyanate, and urethane prepolymers having an isocyanate group at a molecular terminal. Among those, adducts of polyisocyanates are preferred, and trimethylolpropane/tolylene diisocyanate trimer adducts are more preferred.

The compound reacting with the hydroxy group may be contained in the range of 0.4 parts by mass to 16 parts by mass in terms of solid content per 100 parts by mass (solid content) of the resin having a hydroxy group, may be contained in the range of 2.4 parts by mass to 13.6 parts by mass, or may be contained in the range of 5.0 parts by mass to 12 parts by mass. When the amount of the compound reacting with the hydroxy group per 100 parts by mass of the resin having a hydroxy group is in the above range, the compound reacting with the hydroxy group can react sufficiently with the resin having a hydroxy group to form a crosslinked structure, so that the tensile modulus and the heat resistance of the resin layer are easily ensured, and the adhesiveness between the foam base and the resin layer or the adhesive layer is easily ensured.

Optional Components

The resin layer in one or more embodiments contains at least the crosslinked reaction product of the resin (I) and the compound (I) and may contain optional components, if necessary. Examples of the optional components include tackifier resins such as phenol-based tackifier resins, terpene-based tackifier resins, rosin-based tackifier resins, petroleum resins, styrene resins, coumarone-indene resins, and ketone-based resins; crosslinking accelerators; inorganic fillers such as silica, alumina, aluminum flakes, and glass flakes; coupling agents; antioxidants; heat stabilizers; UV absorbers; hydrolysis inhibitors; plasticizers; antistatic agents; lubricants; antiblocking agents; colorants; organic fillers; and crystal nucleators.

In addition, a thermoplastic resin other than the resin (I) can be used as the optional component for the purpose of adjusting the physical properties of the resin layer. Examples of the thermoplastic resin other than the resin (I) include acrylic resins, ketone resins, epoxy resins, and polyester resins. When the resin layer contains a thermoplastic resin, (2) Characteristics and Physical Properties The resin layers (A1) and (A2) in one or more embodiments may each have a tensile modulus at 23° C. of 50 MPa or more, exceeding 50 MPa, 55 MPa or more, 65 MPa or more, 80 MPa or more, or 90 MPa or more. When the tensile modulus of each of the resin layers (A1) and (A2) is set in the above preferred range, the toughness of the double-sided adhesive tape can be increased without impairing the stretchability. Thus, the tape can be easily picked up when peeled off from the adherend to make a trigger to peel from the tape edge. In addition, the tape is less likely to be torn during peeling, and tape residue left on the adherend can be prevented, thereby achieving satisfactory reworkability. In terms of rollability, it is preferable that the resin layers (A1) and (A2) each have a tensile modulus at 23° C. of 1000 MPa or less. Among those, 800 MPa or less is more preferred, 500 MPa or less is further preferred, and 200 MPa or less is particularly preferred. When the tensile modulus of each of the resin layers (A1) and (A2) is in the above range, deterioration of the rollability due to too high toughness of the double-sided adhesive tape can be suppressed. General-purpose resin films such as commercially available polyester films generally exhibit a tensile modulus at 23° C. even higher than the above upper limit and therefore have high toughness but inferior rollability.

The tensile moduli of the resin layers (A1) and (A2) each independently meet the above range, and the tensile modulus of the resin layer (A1) may be the same as or different from the tensile modulus of the resin layer (A2).

The tensile modulus of the resin layer can be adjusted, for example, by the degree of crosslinking (gel fraction) of the resin layer, the hydroxy group value and glass transition temperature of the resin having a hydroxy group, and the kinds and amounts of additives contained in the resin layer.

It is preferable that the resin layers (A1) and (A2) in one or more embodiments each have a tensile elongation at break at 23° C. of 100% or more and 2000% or less. Among those, 200% or more and 1300% or less is further preferred, 300% or more and 1000% or less is more preferred, and 400% or more and 700% or less is particularly preferred. When the tensile elongation at break of each of the resin layers (A1) and (A2) is in the above range, the reworkability and the rollability of the double-sided adhesive tape of one or more embodiments can be further enhanced. In particular, the tearing resistance can be enhanced. The tensile elongations at break of the resin layers (A1) and (A2) each independently meet the above range, and the tensile elongation at break of the resin layer (A1) may be the same as or different from the tensile elongation at break of the resin layer (A2).

It is preferable that the resin layers (A1) and (A2) in one or more embodiments each have a tensile stress at break at 23° C. of 0.1 MPa or more and 1000 MPa or less. Among those, 1 MPa or more and 600 MPa or less is further preferred, 3 MPa or more and 300 MPa or less is more preferred, and 10 MPa or more and 100 MPa or less is particularly preferred. When the tensile stress at break of each of the resin layers (A1) and (A2) is in the above range, the reworkability of the double-sided adhesive tape of one or more embodiments can be further enhanced. In particular, the tearing resistance can be enhanced. The tensile stresses at break of the resin layers (A1) and (A2) each independently meet the above range, and the tensile stress at break of the resin layer (A1) may be the same as or different from the tensile stress at break of the resin layer (A2).

The tensile modulus, the tensile elongation at break, and the tensile stress at break of the resin layer in one or more embodiments can be calculated from the stress-strain curve of the resin layer. The stress-strain curve of the resin layer (called S-S curve) can be obtained as follows. The resin layer is formed by coating a release treated surface of a release liner with the resin layer-forming composition containing at least the resin having a hydroxy group and the compound reacting with the hydroxy group so that the thickness after drying is 30 μm, drying the coating at 85° C. for four minutes, followed by aging at 40° C. for 120 hours. The resin layer is cut into a test piece with a gauge length of 2 cm and a width of 1 cm, and tensile measurement of the test piece is performed with a tensile tester at a pulling speed of 100 mm/min under a measurement environment of a temperature of 23° C. and a humidity of 50%. The tensile elongation at break of the resin layer is calculated from the elongation at break of the test piece (resin layer) using the following formula (1).

Tensile elongation at break [%]={(length of test piece at break−initial length of test piece)/initial length of test piece}×100     formula (1)

The tensile stress at break of the resin layer is calculated from the obtained stress-strain curve and the strength at break per unit area. The tensile modulus of the resin layer is calculated from the slope of the tensile strength at 1 to 3% elongation in the obtained stress-strain curve.

The resin layers (A1) and (A2) in one or more embodiments contain a crosslinked structure of the resin having a hydroxy group and the compound reacting with the hydroxy group as a main component and thereby can exhibit a desired tensile modulus and, in addition, can enhance the shear holding characteristics of the double-sided adhesive tape at high temperatures. The gel fraction indicating the degree of crosslinking of each of the resin layers (A1) and (A2) in one or more embodiments can be 30% by mass or more. Among those, 40% by mass or more is preferred, 45% by mass or more is more preferred, and 50% or more is further preferred. More specifically, the gel fraction of each of the resin layers (A1) and (A2) may be 30% by mass or more and 98% by mass or less, 40% by mass or more and 95% by mass or less, or 45% by mass or more and 90% by mass or less. When the gel fraction of the resin layer is in the above range, the crosslinking density in the resin layer can be increased, and a higher tensile modulus can be easily achieved. The gel fractions of the resin layers (A1) and (A2) each independently meet the above range, and the gel fraction of the resin layer (A1) may be the same as or different from the gel fraction of the resin layer (A2).

The gel fraction of the resin layer in one or more embodiments can be obtained as follows. The resin layer is formed by coating one side of any release liner with the resin layer-forming composition containing at least the resin having a hydroxy group and the compound reacting with the hydroxy group so that the thickness after drying is 50 μm, drying the coating at 85° C. for four minutes, followed by aging at 40° C. for 120 hours. The resin layer is cut into a 50 mm square as a sample, and after the mass (G1) of the sample is measured, the sample is immersed in toluene solution at 23° C. for 24 hours, and the toluene-insoluble portion of the sample after immersion is separated by filtration through a 300-mesh wire cloth. The mass (G2) of the residue is measured after drying at 110° C. for one hour, and the gel fraction is determined according to the following formula.

Gel fraction (% by mass)=$(G2/G1)\times 100$

The thickness of the resin layer in one or more embodiments may be any thickness that achieves both toughness and stretchability. For example, 100 μm or less is preferred, among those, 50 μm or less is preferred, 45 μm or less is more preferred, and 40 μm or less is further preferred. Specifically, the thickness of the resin layer may be 5 μm or more and 100 μm or less, 10 μm or more and 50 μm or less, or 15 μm or more and 45 μm or less. With the thickness of the resin layer in the above range, even when the storage modulus of the resin layer is high, the reinforcement function due to the toughness of the resin layer can be achieved sufficiently without impairing the rollability of the double-sided adhesive tape, and excellent reworkability, that is, easily picking up the resin layer in peeling and peeling from the tape edge and being less likely to be torn during peeling, can be achieved. If the thickness of the resin layer is too large, the overall thickness of the double-sided adhesive tape may increase, which may reduce the rollability, and thickness reduction of electronic devices and the like may be hindered. In addition, when a thick resin layer is formed by a method described later, bubbles are formed to make the resin layer easily tear. The thicknesses of the resin layers (A1) and (A2) each independently meet the above range, and the thickness of the resin layer (A1) may be the same as or different from the thickness of the resin layer (A2).

In one or more embodiments, the resin layers (A1) and (A2) are disposed in direct contact with one surface and the other surface of the foam base, respectively. The wording "the resin layer is disposed in direct contact with the surface of the foam base" means that the foam base and the resin layer are in contact with each other and no other layer such as an adhesive layer is interposed between the foam base and the resin layer. The resin layers (A1) and (A2) are provided on the surfaces of the foam base by the production method described in the section "5. Production Method" below, so that bonds are presumably also formed between the resin layers and the foam base. Thus, delamination is less likely to occur between the resin layers and the foam base, and the shear holding characteristics, in particular the shear holding characteristics at high temperatures are excellent. In addition, delamination is less likely to occur during peeling, and peeling can be easily performed.

2. Foam Base

The foam base in one or more embodiments is a layer supporting the resin layers and the adhesive layers.

(1) Composition

For example, polyolefin foam, polyurethane foam, acrylic foam, rubber foam, and the like can be used as the foam base. Among those, polyolefin foam is preferred because it is easy to handle even at a small thickness, can conform to bending deformation suitably, and tends to ensure cushioning properties (impact resistance).

A polyolefin resin forming the polyolefin foam may include at least one selected from the group consisting of polyethylene resins, polypropylene resins, and olefinic elastomers, and among those, polyethylene resins are preferred.

Examples of the polyethylene resins forming the polyolefin foam include ethylene homopolymers, ethylene-α-olefin copolymers, ethylene-based ethylene-vinyl acetate copolymers, ethylene-based ethylene-ethyl acrylates (EEA), and ethylene-based ethylene-butyl acrylate copolymers (EBA). These resins can be used singly or in combination of two or more. In the above copolymers, "ethylene-based" means that ethylene is contained most abundantly among all monomers constituting the copolymer, and it is preferable that ethylene accounts for 50% by mass or more of all monomers.

Examples of the ethylene homopolymers include linear low-density polyethylene (LLDPE), low-density polyethylene (LDPE), medium-density polyethylene (MDPE), and high-density polyethylene (HDPE).

The ethylene-α-olefin copolymers are copolymers of ethylene and α-olefins as main components. Examples of the α-olefins that constitute the ethylene-α-olefin copolymers include propylene, 1-butene, 1-pentene, 4-methyl-1-pentene, 1-hexene, 1-heptene, and 1-octene.

Among those described above, polyethylene resins with a narrow molecular weight distribution that are obtained by using metallocene compounds containing tetravalent transition metals as polymerization catalysts may be used as the polyethylene resin. In the polyethylene resins obtained by the above method, the copolymerization ratio of the copolymerization components of the polyethylene resin having any molecular weight can be adjusted almost equally, resulting in a substantially uniformly crosslinked polyolefin foam. The substantially uniformly crosslinked polyolefin foam is easily drawn and the overall thickness is easily made uniform.

Polyethylene resins obtained by other production methods, other than those obtained by using metallocene compounds containing tetravalent transition metals, may be used as the polyethylene resin.

Examples of the polypropylene resins forming the polyolefin foam include, but not limited to, polypropylene, and propylene-α-olefin copolymers containing 50% by mass or more of propylene, and copolymers of propylene monomers and other copolymerizable monomers can also be used, if necessary. These may be used singly or in combination of two or more. Examples of α-olefin that constitutes the propylene-α-olefin copolymers include ethylene, 1-butene, 1-pentene, 4-methyl-1-pentene, 1-hexene, 1-heptene, and 1-octene. The propylene-α-olefin copolymers may be random copolymers or block copolymers.

Among those, the polyolefin foam base may be a foam base containing a polyethylene resin because it has a relatively uniform thickness and more suitable flexibility. The polyolefin foam base may be a foam base containing one or more selected from linear low-density polyethylene (LLDPE), low-density polyethylene (LDPE), medium-density polyethylene (MDPE), and high-density polyethylene (HDPE) because it is flexible and a higher tensile strength.

When the polyolefin foam base is a foam base containing a polyethylene resin, it is preferable that the amount of the polyethylene resin in the polyolefin resin forming the polyolefin foam base is 40% by mass or more. Among those, 50% by mass or more is preferred, 60% by mass or more is further preferred, 80% by mass or more is more preferred, and 100% is particularly preferred, that is, a polyethylene resin foam base in which the polyolefin resin forming the polyolefin foam base is polyethylene resin alone is particularly preferred.

The foam base may further contain an elastomer resin in addition to the resins described above as a resin forming the foam base. Examples of the elastomer resin include, but not limited to, thermoplastic elastomer resins such as olefinic elastomer resins, styrenic elastomer resins, polyvinyl chloride elastomer resins, polyurethane elastomer resins, polyester elastomer resins, and polyamide elastomer resins. These may be used singly or in combination of two or more.

The foam base may contain a colorant in addition to the resin forming the foam base. For example, when light-shielding effect, concealing effect, and light resistance are imparted to the double-sided adhesive tape of one or more embodiments, it is preferable to use the foam base colored in black. The black foam base can be obtained by adding a black colorant to the resin forming the foam base.

Examples of the black colorant that can be used include carbon black, graphite, copper oxide, manganese dioxide, aniline black, perylene black, titanium black, cyanine black, activated carbon, ferrite, magnetite, chromium oxide, iron oxide, molybdenum disulfide, chromium complex, complex oxide-based black dyes, and anthraquinone-based organic black dyes. Among those, it is preferable to use carbon black as the colorant in terms of cost, availability, insulation, and heat resistance to withstand the temperatures in extrusion and heat foaming processes of the resin composition in production of the foam base.

When design, light reflectivity, and the like are imparted to the double-sided adhesive tape of one or more embodiments, it is preferable to use the foam base colored in white. The white foam base can be obtained by adding a white colorant to the resin forming the foam base.

Examples of the white colorant that can be used include inorganic white colorants such as titanium dioxide, zinc oxide, aluminum oxide, silicon oxide, magnesium oxide, zirconium oxide, calcium oxide, tin oxide, barium oxide, cesium oxide, yttrium oxide, magnesium carbonate, calcium carbonate, barium carbonate, zinc carbonate, aluminum hydroxide, magnesium hydroxide, calcium hydroxide, zinc hydroxide, aluminum silicate, calcium silicate, barium sulfate, calcium sulfate, barium stearate, zinc oxide, talc, silica, alumina, clay, kaolin, titanium phosphate, mica, gypsum, white carbon, diatomaceous earth, bentonite, lithopone, zeolite, and sericite, and organic white colorants such as silicone resin particles, acrylic resin particles, urethane resin particles, and melamine resin particles.

Among those, it is preferable to use titanium oxide, aluminum oxide, and zinc oxide as the colorant in terms of cost, availability, color tone, and heat resistance to withstand the temperatures in extrusion and heat foaming processes of the resin composition in production of the foam base.

In addition to the resins described above, the foam base may contain, if necessary, known additives such as a plasticizer, an antioxidant, a foaming aid such as zinc oxide, a bubble nucleation adjuster, a heat stabilizer, a flame retardant such as aluminum hydroxide and magnesium hydroxide, an antistatic agent, glass and plastic balloons/beads, a filler such as metal powders and metal compounds, a conductive filler, and a heat conductive filler.

(2) Characteristics and Physical Properties

The foam base in one or more embodiments may or may not have a crosslinked structure and can be set appropriately according to the kind of the resin forming the foam base, and the physical properties of the double-sided adhesive tape of one or more embodiments, such as impact resistance, reworkability, and shear bond strength. When the foam base has a crosslinked structure, the degree of crosslinking (gel fraction) may be 5% by mass or more and 60% by mass or less, or 10% by mass or more and 55% by mass or less. When the degree of crosslinking of the foam base is in the above range, surface roughness attributable to broken bubbles that may be formed near the surface of the foam base can be prevented, and satisfactory adhesiveness to the resin layer and impact resistance can be further enhanced. The degree of crosslinking of the foam base can be adjusted by the amount of crosslinking agent used in the production of the foam base.

The degree of crosslinking of the foam base can be measured by the following method. First, a set of five sheets of 40 mm×50 mm square foam bases is used as a sample, and the total mass (G1) thereof is measured. The sample is then immersed in xylene at 120° C. for 24 hours, then the xylene-insoluble portion is separated by filtration through a 300 mesh wire cloth, and the mass (G2) of the residue is measured after drying at 110° C. for one hour. The xylene-insoluble portion determined according to the following formula is defined as the degree of crosslinking.

Degree of crosslinking (mass %)=$(G2/G1) \times 100$

The foam base in one or more embodiments may have an interlaminar strength of 10 N/cm or more, 10 N/cm or more and 50 N/cm or less, or 10 N/cm or more and 35 N/cm or less. When the interlaminar strength of the foam base is in the above range, the impact resistance of the double-sided adhesive tape can be further increased, and the tape can be easily cleaved at the foam base by applying a certain force.

The interlaminar strength of the foam base is the value measured by the following method. First, a double-sided adhesive tape for measuring the interlaminar strength is prepared by attaching a 50 μm thick adhesive layer with strong adhesion to each of both surfaces of the foam base, followed by aging at 40° C. for 48 hours. The strong adhesion refers to adhesive strength to such a level that does not cause peeling from the adherend and the foam base even in a high-speed peel test described below. Then, one of the adhesive layers forming the double-sided adhesive tape for measuring the interlaminar strength is lined with a 25 μm thick polyester film and cut into 1 cm in the width direction of the foam base and 15 cm in the flow direction thereof. The resulting adhesive tape is pressure-bonded with a polyester film with a thickness of 50 μm, a width of 3 cm, and a length of 20 cm at 23° C. and 50% RH with a 2 kg roller with one round trip, and left at 60° C. for 48 hours and then at 23° C. for 24 hours. At 23° C. and 50% RH, the side bonded to the 50 μm thick polyester film is fixed to the mounting jig of a high-speed peel test machine, and the 25 μm thick polyester film is pulled in a direction at 90 degrees at a pulling speed of 15 m/min to measure the maximum strength when the foam base is split.

The density of the foam base in one or more embodiments can be 0.8 g/cm$^3$ or less. Among those, 0.6 g/cm$^3$ or less is preferred, and 0.55 g/cm$^3$ or less is more preferred. 0.45 g/cm$^3$ or less is further preferred, and 0.42 g/cm$^3$ or less is particularly preferred. The density of the foam base in one or more embodiments may be 0.1 g/cm$^3$ or more, or 0.15 g/cm$^3$ or more. More specifically, the density of the foam base may be 0.1 g/cm$^3$ or more and 0.55 g/cm$^3$ or less, 0.1 g/cm$^3$ or more and 0.45 g/cm$^3$ or less, or 0.15 g/cm$^3$ or more and 0.42 g/cm$^3$ or less. When the density of the foam base is in the above range, the impact resistance of the double-sided adhesive tape can be further increased, and the tape can be cleaved at the foam base when a certain force is applied to the double-sided adhesive tape.

The foam base in one or more embodiments may have a compressive strength at 25% of 700 kPa or less. Among those, 10 kPa or more and 500 kPa or less is preferred, 10 kPa or more and 350 kPa or less is more preferred, 30 kPa or more and 200 kPa or less is further preferred, and 50 kPa or more and 180 kPa or less is particularly preferred. When the compressive strength at 25% of the foam base is in the above range, a double-sided adhesive tape with suitable impact resistance and suitable conformability to the adherend can be obtained, and the tape can be cleaved at the foam base when a certain force is applied to the double-sided adhesive tape.

The compressive strength at 25% of the foam base is the value measured according to JIS K6767. Specifically, the foam bases cut into a 25 mm square are stacked to a thickness of approximately 10 mm to be used as a test piece. The test piece was clamped between stainless steel plates with an area larger than the foam base, and the strength of the test piece compressed to approximately 2.5 mm (25% of its original thickness) at a speed of 10 mm/min at 23° C. is measured. The measured value is defined as the compression strength at 25%.

The tensile strength of the foam base in one or more embodiments in each of the flow direction and the width direction is not limited, but the tensile strength in each of the flow direction and the width direction may be 500 N/cm$^2$ or more and 1700 N/cm$^2$ or less, or 600 N/cm$^2$ or more and 1500 N/cm$^2$ or less. The tensile elongation at break in the tensile test is not limited, but the tensile elongation in the flow direction may be 100% or more and 1200% or less, 100% or more and 1000% or less, or 200% or more and 600% or less. When the tensile strength and the tensile elongation of the foam base are in the above respective ranges, the double-sided adhesive tape can be easily rolled up, degradation of processability and affixing workability can be suppressed, and the ease of peeling and the resistance to tearing can be further enhanced when the double-sided adhesive tape is peeled off from the adherend.

The tensile strength in the flow direction and the width direction and the tensile elongation of the foam base can be measured according to JIS K6767 and specifically refer to the maximum strength and the maximum elongation obtained when the foam base cut into a gauge length of 2 cm and a width of 1 cm is measured using a Tensilon tensile tester at a pulling speed of 300 mm/min at 23° C. and 50% RH.

The average bubble diameters in the flow direction and the width direction of the foam base are not limited, but may be in the range of 10 μm to 500 μm, in the range of 30 μm to 400 μm, or in the range of 50 μm to 300 μm. When the average bubble diameters in the flow direction and the width direction of the foam base are in the above range, a double-sided adhesive tape with high bonding and impact resistance can be obtained.

The ratio of the average bubble diameters in the flow direction and the width direction of the foam base (the average bubble diameter in the flow direction/the average bubble diameter in the width direction) is not limited, but may be in the range of 0.2 to 4, in the range of 0.3 to 3, or in the range of 0.4 to 1. When the ratio of the average bubble diameters in the flow direction and the width direction of the foam base is in the above range, the flexibility and the tensile strength are less likely to vary in the flow direction and the width direction of the foam base.

The average bubble diameter in the thickness direction of the foam base in one or more embodiments may be in the range of 3 μm to 100 μm, in the range of 5 μm to 80 μm, or in the range of 5 μm to 50 μm. The average bubble diameter in the thickness direction may be ½ or less of the thickness of the foam base, or ⅓ or less. When the ratio of the average bubble diameter in the thickness direction to the thickness of the foam base is in this range, the density and strength of the foam base can be easily ensured, and the impact resistance, rollability, and adhesiveness to the adherend required for the double-sided adhesive tape can be improved. In addition, in combination with the resin layer described above, the ease of picking up and the resistance to tearing can be further enhanced when the double-sided adhesive tape is peeled off from the adherend.

In the foam base in one or more embodiments, the ratio of the average bubble diameter in the flow direction to the average bubble diameter in the thickness direction (the average bubble diameter in the flow direction/the average bubble diameter in the thickness direction) and the ratio of the average bubble diameter in the width direction to the average bubble diameter in the thickness direction (the average bubble diameter in the width direction/the average bubble diameter in the thickness direction) may be both 1 or more, 3 or more, or in the range of 4 to 25. When the foam base with the above average bubble diameter ratio is used, a double-sided adhesive tape with excellent flexibility in the thickness direction and excellent impact resistance, rollability, and adhesiveness to the adherend can be obtained. In addition, in combination with the resin layer described above, the ease of peeling and the resistance to tearing can be further enhanced when the double-sided adhesive tape is peeled off from the adherend.

The average bubble diameter in the width direction, the average bubble diameter in the flow direction, and the average bubble diameter in the thickness direction of the foam base can be measured as follows. First of all, the foam base is cut into 1 cm in the width direction and 1 cm in the flow direction. Then, a digital microscope (product name "KH-7700" from HiROX Co., Ltd.) is set to 200× magnification to observe a cut surface of the foam base in the width direction or the flow direction. In doing so, all of the bubble diameters of bubbles present in the range of 1.5 mm in the flow direction or the width direction of the cut surface are measured. Then, the range of 1.5 mm is changed, and all of the bubble diameters of bubbles present in the ranges at any 10 locations are measured. The value obtained by calculating the average of the measured bubble diameters is used as the average bubble diameter.

It is preferable that the foam base in one or more embodiments has a closed-cell foam structure because it can effectively prevent water intrusion or dust from the cut surface of the foam base. As for the shape of the bubbles forming the closed-cell foam structure, it is preferable that the average bubble diameter in the flow direction or the width direction or both directions is larger than the average bubble diameter in the thickness direction in order to obtain a double-sided adhesive tape with moderate conformability to the adherend and cushioning properties.

The thickness of the foam base in one or more embodiments is not limited but may be 350 μm or less. Among those, 50 μm or more and 300 μm or less is preferred, 80 μm or more and 250 μm or less is more preferred, and 100 μm or more and 200 μm or less is further preferred. When the thickness of the foam base is in the above range, the double-sided adhesive tape of one or more embodiments, even having a small total thickness, can exhibit even higher impact resistance and can achieve both rollability and reworkability.

The density, interlaminar strength, compressive strength, tensile strength, and the like of the foam base can be adjusted as appropriate by the material and foam structure of the foam base used.

The foam base in one or more embodiments may be subjected to surface treatment such as corona treatment, flame treatment, plasma treatment, hot air treatment, ozone treatment, ultraviolet treatment, and bonding-improving treatment in order to improve adhesiveness to the resin layer. In the surface of the surface-treated foam base, the wetting index with a wetting agent may be 36 mN/m or more, 40 mN/m or more, or 48 mN/m or more to maintain satisfactory adhesiveness to the resin layer.

The foam base in one or more embodiments may have a skin layer on a surface in the thickness direction. When the foam base has a skin layer, the surface of the foam base in direct contact with the resin layer means the skin layer. When the foam base has a skin layer on its surface, the surface of the foam base is smoother to enhance the adhesiveness to the resin layer.

The skin layer refers to a layer (region) present on the surface layer of the foam base and adjacent to the region (foamed region) with bubbles inside the foam base and may be present on only one surface or both surfaces of the foam base. The skin layer has a higher density than the foamed region of the foam base and has no bubbles or very few bubbles. The skin layer is distinguished from the resin layer.

(3) Production Method

The foam base in one or more embodiments can be produced using a known method of producing foams, depending on the resin forming the foam base, and the production method is not limited.

For example, when the foam base in the embodiment is a polyolefin foam, the production method is not particularly limited, but an example of the production method includes the steps of: supplying a polyolefin resin composition containing a polyolefin resin containing 40% by weight or more of a polyethylene resin obtained using a metallocene compound containing a tetravalent transition metal as a polymerization catalyst, a thermal decomposition-type foaming agent, a foaming aid, and a colorant for coloring the foam in black or white, into an extruder to melt and knead the polyolefin resin composition, and extruding a sheet from the extruder to produce a polyolefin resin sheet; crosslinking the polyolefin resin sheet; foaming the polyolefin resin sheet; and melting or softening the resulting foam sheet to draw the foam sheet in one or both of the flow direction and the width direction. The step of drawing the foam sheet may be performed if necessary and may be performed multiple times.

In order to prevent appearance defects such as color unevenness and foaming defects such as excessive or no foaming, it is preferable to produce a masterbatch of the colorant, the thermal decompression-type foaming agent, the foaming aid, and the like with the polyolefin resin or another thermoplastic resin miscible with the polyolefin resin.

The thermal decompression-type foaming agent is any agents conventionally used to produce foams. Examples include azodicarbonamide, N,N'-dinitrosopentamethylenetetramine, and p-toluenesulfonyl semicarbazide, and among those, azodicarbonamide is preferred. The thermal decomposition-type foaming agents may be used singly or in combination of two or more.

The amount of the thermal decomposition-type foaming agent added may be determined as appropriate according to the expansion ratio of the polyolefin foam, and the amount added may be 1 part by mass or more and 40 parts by mass or less per 100 parts by mass of the polyolefin resin, or 1 part by mass or more and 30 parts by mass or less because if so, it is easier to adjust the expansion ratio, the tensile strength, the compression recovery rate, and the like to the desired range.

The polyolefin foam base is crosslinked, for example, by irradiating the polyolefin foam base with ionizing radiation, or by blending an organic peroxide in advance in the polyolefin resin composition and heating the resulting polyolefin foam base to decompose the organic peroxide. These methods may be used in combination.

Examples of the ionizing radiation include electron beams, alpha rays, beta rays, and gamma rays. The dose of ionizing radiation is adjusted as appropriate such that the degree of crosslinking of the polyolefin foam base falls within the preferred range above, and a range of 5 kGy to 200 kGy is preferred. It is preferable to irradiate both surfaces of the polyolefin foam base with ionizing radiation in order to achieve a uniform foamed state, and it is more preferable to irradiate both surfaces with the same dose.

Examples of the organic peroxide include 1,1-bis(t-butylperoxy)3,3,5-trimethylcyclohexane, 1,1-bis(t-butylperoxy)cyclohexane, 2,2-bis(t-butylperoxy)octane, n-butyl-4,4-bis(t-butylperoxy)valerate, di-t-butyl peroxide, t-butylcumyl peroxide, dicumyl peroxide, α,α'-bis(t-butylperoxy-m-isopropyl)benzene, 2,5-dimethyl-2,5-di(t-butylperoxy)hexane, 2,5-dimethyl-2,5-di(t-butylperoxy)hexyne-3, benzoyl peroxide, cumyl peroxyneodecanoate, t-butyl peroxybenzoate, 2,5-dimethyl-2,5-di(benzoylperoxy)hexane, t-butylperoxyisopropyl carbonate, and t-butyl peroxy allyl carbonate. These may be used singly or in combination of two or more.

The organic peroxide may be in the range of 0.01 parts by mass or more and 5 parts by mass or less per 100 parts by mass of the polyolefin resin, or in the range of 0.1 parts by mass or more and 3 parts by mass or less to suppress residual decomposition residue of the organic peroxide.

The polyolefin resin sheet can be foamed by any method. Examples of the method include heating by hot air, heating by infrared rays, using salt bath, and using oil bath, and these methods may be used in combination. Among these methods, heating by hot air and heating by infrared rays are preferred because if so, there is little difference in appearance between the front surface and the back surface of the polyolefin foam base.

The foam base may be drawn. The drawing may be performed after the polyolefin resin sheet is foamed to produce a foam base, or may be performed when the polyolefin resin sheet is foamed.

When the foam base is drawn after the polyolefin resin sheet is foamed to produce a foam base, the foam base may be continuously drawn while the molten state at the time of foaming is kept without cooling the foam base, or the foam base may be drawn after the foam base is cooled and then the foam sheet is heated again into a molten or softened state.

The molten state of the foam base refers to a state in which the foam base is heated above the melting point of the polyolefin resin forming the foam base. The softening of the foam base refers to a state of heating to a temperature equal to or higher than the softening point and lower than the melting point of the polyolefin resin forming the foam base. The foam base is drawn so that the bubbles in the foam base are drawn and deformed in a predetermined direction, resulting in a polyolefin foam with a bubble aspect ratio within a predetermined range.

The drawing direction of the foam base may be the flow direction or the width direction of the elongated polyolefin resin sheet or may be the flow direction and the width direction. When the foam base is drawn in the flow direction and the width direction, the foam base may be drawn in the flow direction and the width direction simultaneously or may be drawn separately in one direction.

Examples of the method of drawing the foam base in the flow direction include a method in which the foam base is drawn in the flow direction by winding up the elongated polyolefin resin sheet while cooling after foaming, at a speed (take-up speed) higher than the speed of feeding the elongated polyolefin resin sheet to the foaming step (feed speed), and a method in which the foam base is drawn in the flow direction by winding up the foam base at a speed (take-up speed) higher than the speed of feeding the resulting foam base to the drawing step (feed speed).

Since the polyolefin resin sheet tends to expand in the flow direction due to its own foaming, it is preferable that the amount of expansion in the flow direction due to foaming of the polyolefin resin sheet is taken into consideration when the foam base obtained using the polyolefin resin sheet is drawn in the flow direction, and the feed speed and the take-up speed of the foam base are adjusted such that the polyolefin resin sheet is drawn in the flow direction more than the amount of expansion.

A preferred method of drawing the foam base in the width direction is a method in which the foam base is drawn in the width direction by gripping both ends in the width direction of the foam base with a pair of grippers and gradually moving the grippers in a direction away from each other. Since the polyolefin resin sheet expands in the width direction due to its own foaming, it is preferable that the amount of expansion in the width direction due to foaming of the polyolefin resin sheet is taken into consideration when the foam base is drawn in the width direction, and adjustment is made such that the foam base is drawn in the width direction more than the amount of expansion.

The drawing ratio in the flow direction of the foam base may be 1.1 to 5 and more, or 1.3 to 3.5. The drawing ratio in the width direction of the foam base may be 1.2 to 4.5, or 1.5 to 3.5. When the foam base with a drawing ratio in the above range is used, satisfactory flexibility and tensile strength can be maintained.

3. Adhesive Layers (B1) and (B2)

The adhesive layers (B1) and (B2) in one or more embodiments are disposed on the surfaces of the resin layers (A1) and (A2) on the sides opposite to the foam base.

The adhesive layers (B1) and (B2) may be collectively referred to as adhesive layer.

The wording "the adhesive layer is disposed on the surface of the resin layer on the side opposite the foam base" means that the adhesive layer is disposed on the surface of the resin layer on the side opposite to the foam base directly or with another layer interposed. More specifically, the adhesive layer (B1) may be disposed in direct contact with the surface of the resin layer (A1) (the surface on the side opposite to the foam base), or may be disposed with another layer interposed between the resin layer (A1) and the adhesive layer (B1). Similarly, the adhesive layer (B2) may be disposed in direct contact with the surface of the resin layer (A2) (the surface on the side opposite to the foam base), or may be disposed with another layer interposed between the resin layer (A2) and the adhesive layer (B2). Among those, it is preferable that the adhesive layer (B1) is disposed in direct contact with the surface of the resin layer (A1) (the surface on the side opposite to the foam base) and the adhesive layer (B2) is disposed in direct contact with the surface of the resin layer (A2) (the surface on the side opposite to the foam base). This is because the hydroxy groups and the functional group residues in the resin layer react with the functional groups in the adhesive layer to form cross-linkage between the layers, thereby increasing interlaminar strength.

For example, acrylic adhesive, urethane adhesive, synthetic rubber adhesive, natural rubber adhesive, silicone adhesive, and the like can be used as an adhesive forming the adhesive layer in one or more embodiments. Among those, it is preferable to use an acrylic adhesive that contains as its main component an acrylic polymer obtained by polymerizing a monomer component containing a (meth)acrylic monomer, and contains a tackifier resin, a crosslinking agent, and the like, if necessary. "The main component of the adhesive" refers to the component most abundantly contained in the adhesive, excluding a solvent and the like.

Examples of the (meth)acrylic monomer that can be used in the production of the acrylic polymer include (meth) acrylates having an alkyl group having 1 to 12 carbon atoms, such as methyl (meth)acrylate, ethyl (meth)acrylate, n-butyl (meth)acrylate, isobutyl (meth)acrylate, t-butyl (meth)acrylate, n-hexyl (meth)acrylate, n-octyl (meth)acrylate, isooctyl (meth)acrylate, isononyl (meth)acrylate, cyclohexyl (meth) acrylate, and 2-ethylhexyl (meth)acrylate. The term (meth) acrylate is a general term of acrylate and methacrylate.

Among those, it is preferable to use a (meth)acrylate having an alkyl group having 4 to 12 carbon atoms as the (meth)acrylic monomer, and it is more preferable to use a (meth)acrylate having an alkyl group having 4 to 8 carbon atoms. It is particularly preferable to use one or both of n-butyl acrylate and 2-ethylhexyl acrylate to achieve both high bonding strength and high conformability.

The (meth)acrylate having an alkyl group having 1 to 12 carbon atoms may be used in amount of 60% by mass or more of the total amount of monomer component used in the production of the acrylic polymer, may be used in a range of 80% by mass or more and 98.5% by mass or less, or may be used in a range of 90% by mass or more and 98.5% by mass or less to achieve both high bonding strength and high conformability.

Highly polar vinyl monomers can be contained as a monomer component used in the production of the acrylic polymer, in addition to the (meth)acrylic monomer. As the highly polar vinyl monomers, a vinyl monomer having a hydroxy group, a vinyl monomer having a carboxy group, a vinyl monomer having an amide group, and the like can be used singly or in combination of two or more.

As the vinyl monomer having a hydroxy group, for example, (meth)acrylates having a hydroxy group such as 2-hydroxyethyl (meth)acrylate, 2-hydroxypropyl (meth)acrylate, 4-hydroxybutyl (meth)acrylate, and 6-hydroxyhexyl (meth)acrylate can be used.

As the vinyl monomer having a carboxy group, for example, acrylic acid, methacrylic acid, itaconic acid, maleic acid, (meth)acrylic acid dimer, crotonic acid, ethylene oxide-modified succinic acid acrylate, and the like can be used. Among those, the use of acrylic acid is preferred.

As the vinyl monomer having an amide group, for example, N-vinylpyrrolidone, N-vinylcaprolactam, acryloylmorpholine, acrylamide, N,N-dimethylacrylamide, and the like can be used.

As the highly polar vinyl monomers, vinyl acetate, ethylene oxide-modified succinic acid acrylate, 2-acrylamido-2-methylpropanesulfonic acid, and the like can be used, in addition to the vinyl monomer having a hydroxy group, the vinyl monomer having a carboxy group, and the vinyl monomer having an amide group.

When the adhesive contains a crosslinking agent described below, an acrylic polymer having a functional group that reacts with the functional group of the crosslinking agent may be used as the acrylic polymer. The functional group that reacts with the functional group of the crosslinking agent is, for example, a hydroxy group. In the acrylic polymer having a hydroxy group, a hydroxy group can be introduced into the acrylic polymer, for example, by using the vinyl monomer having a hydroxy group described above as the monomer used in the production of the acrylic polymer. In other words, the monomer component used in the production of the acrylic polymer may include the acrylic polymer having a hydroxy group.

The highly polar vinyl monomer may be used in the range of 1.5% by mass or more and 20% by mass or less of the total amount of monomer component used in the production of the acrylic polymer, may be used in a range of 1.5% by mass or more and 10% by mass or less, or may be used in a range of 2% by mass or more and 8% by mass or less to achieve both high bonding strength and high conformability.

In terms of improving the interlaminar strength between the resin layer and the adhesive layer by a reaction with the functional group such as the isocyanate group present in the resin layer, it is preferable that the highly polar vinyl monomer includes at least a vinyl monomer having a hydroxy group. The vinyl monomer having a hydroxy group may be used in the range of 0.01% by mass or more and 1.0% by mass or less, or may be used in the range of 0.03% by mass or more and 0.3% by mass or less of the total amount of monomer component used in the production of the acrylic polymer.

The acrylic polymer can be produced by polymerizing the above monomers by a method such as solution polymerization, bulk polymerization, suspension polymerization, or emulsion polymerization. Solution polymerization is preferred to improve the production efficiency of the acrylic polymer. An example of the solution polymerization is radical polymerization by mixing and stirring a monomer component containing a (meth)acrylic monomer, a polymerization initiator, and an organic solvent preferably at a temperature of 40° C. to 90° C.

Examples of the polymerization initiator that can be used include peroxides such as benzoyl peroxide and lauryl peroxide, azo thermal polymerization initiators such as azobisisobutylnitrile, acetophenone-based photoinitiators, benzoin ether-based photoinitiators, benzyl ketal-based photoinitiators, acylphosphine oxide-based photoinitiators, benzoin-based photoinitiators, and benzophenone-based photoinitiators.

The acrylic polymer obtained by the above method may be dissolved or dispersed in an organic solvent, for example, when produced by solution polymerization.

The weight average molecular weight of the acrylic polymer may be 400,000 or more and 3,000,000 or less in order to exhibit high bonding strength, or 700,000 or more and 2,500,000 or less in terms of further improving the bonding strength.

The weight average molecular weight of the acrylic polymer refers to a value measured by gel permeation chromatography (GPC) and converted in terms of polystyrene. Specifically, the weight average molecular weight can be measured using a GPC system (HLC-8320GPC) from Tosoh Corporation under the following conditions.

Conditions
  Sample concentration: 0.5% by mass (tetrahydrofuran solution)
  Sample injection volume: 100 μL
  Eluent: tetrahydrofuran
  Flow rate: 1.0 mL/min
  Measuring temperature: 40° C.
  Main columns: TSKgel GMHHR-H (20)×2
  Guard column: TSKgel HXL-H
  Detector: differential refractometer
  Weight average molecular weight of standard polystyrene: 10,000 to 20,000,000 (from Tosoh Corporation)

It is preferable that the adhesive for forming the adhesive layer in one or more embodiments contains a tackifier resin in order to achieve both of high bonding strength to the adherend and another layer adjacent to the adhesive layer, such as the resin layer, and high conformability. Examples of the tackifier resin that can be used include rosin-based tackifier resins, polymerized rosin-based tackifier resins, polymerized rosin ester-based tackifier resins, rosin phenol-based tackifier resins, stabilized rosin ester-based tackifier resins, disproportionated rosin ester-based tackifier resins, hydrogenated rosin ester-based tackifier resins, terpene-based tackifier resins, terpene phenol-based tackifier resins, petroleum resin-based tackifier resins, and (meth)acrylate resin-based tackifier resins. When an emulsion-type adhesive is used as the adhesive, an emulsion-type tackifier resin may be used as the tackifier resin.

As the tackifier resin, among those, disproportionated rosin ester-based tackifier resins, polymerized rosin ester-based tackifier resins, rosin phenol-based tackifier resins, hydrogenated rosin ester-based tackifier resins, (meth)acrylate resins, terpene phenol-based resins, and petroleum-based resins may be used singly or in combination of two or more.

It is preferable that the softening point of the tackifier resin may be in the range of 30° C. to 180° C., or in the range of 70° C. to 140° C., to achieve both high bonding strength to the adherend and another layer adjacent to the adhesive layer, such as the resin layer, and high conformability.

When the (meth)acrylate tackifier resin is used, it is preferable to use a (meth)acrylate tackifier resin with a glass transition temperature of 30° C. to 200° C., or 50° C. to 160° C. to achieve both high bonding strength to the adherend and another layer adjacent to the adhesive layer, such as the resin layer, and high conformability.

The tackifier resin may be used in the range of 5 parts by mass or more and 65 parts by mass or less per 100 parts by mass of the resin serving as the main component of the adhesive layer (for example, acrylic polymer in the case of an acrylic adhesive), or may be used in the range of 8 parts by mass or more and 55 parts by mass or less to achieve both high bonding strength to the adherend and the resin layer and high conformability.

The adhesive used to form the adhesive layer in one or more embodiments may include a crosslinking agent to ensure high bonding strength to the adherend and another layer adjacent to the adhesive layer, such as the resin layer. For example, an isocyanate-based crosslinking agent, an epoxy-based crosslinking agent, a metal chelate-based crosslinking agent, or an aziridine-based crosslinking agent can be used as the crosslinking agent. Among those, it is preferable to use one or both of an isocyanate-based crosslinking agent and an epoxy-based crosslinking agent reactive with the acrylic polymer as the crosslinking agent. It is more preferable to use an isocyanate-based crosslinking agent.

Examples of the isocyanate-based crosslinking agent that can be used include tolylene diisocyanate, naphthylene-1,5-diisocyanate, hexamethylene diisocyanate, diphenylmethane diisocyanate, xylylene diisocyanate, and trimethylolpropane-modified tolylene diisocyanate. Tolylene diisocyanate and trimethylolpropane-modified tolylene diisocyanate are preferred.

The amount of the crosslinking agent can be selected as appropriate such that the gel fraction of the adhesive layer in toluene is in the range described below.

The adhesive forming the adhesive layer in one or more embodiments may contain additives such as a plasticizer, a softener, an antioxidant, a flame retardant, glass or plastic fibers/balloons, beads, a filler such as metal, metal oxide, or metal nitride, a colorant such as pigment and dye, a leveling agent, a thickening agent, a water repellent agent, and an antifoaming agent.

The adhesives used to form the adhesive layers (B1) and (B2) may have the same composition or may have different compositions.

(2) Characteristics and Physical Properties

The gel fraction in toluene of the adhesive layer in one or more embodiments may be 40% by mass or more and 80% by mass or less, 30% by mass or more and 70% by mass or less, or 35% by mass or more and 65% by mass or less. When the gel fraction of the adhesive layer is in the range above, an adhesive sheet that achieves both high bonding strength to the adherend and another layer adjacent to the adhesive layer, such as the resin layer, and high conformability can be obtained. The gel fractions of the adhesive layers (B1) and (B2) may be the same value or different values in the above range.

The gel fraction of the adhesive layer refers to a value measured by the method described below. First, the adhesive layer is formed by coating a release treated surface of a release liner with the adhesive to a thickness after drying of 50 μm, and drying the coating at 100° C. for three minutes, followed by aging at 40° C. for two days. Then, the adhesive layer is cut into a square of 50 mm in length and 50 mm in width as a test piece. After the mass (G1) of the test piece is measured, the test piece is immersed in toluene for 24 hours at 23° C. After the immersion, the mixture of the test piece and toluene was filtered through a 300 mesh wire cloth to extract an insoluble component in toluene. The mass (G2) of the insoluble component dried for one hour at 110° C. is measured, and the gel fraction is calculated based on the mass (G1) and the mass (G2) and the following formula.

$$\text{Gel fraction (\% by mass)} = (G2/G1) \times 100$$

The temperature at which the adhesive layer in one or more embodiments exhibits the peak value of loss tangent (tan δ) at a frequency of 1 Hz may be in the range of −40° C. to 15° C. When the peak value of loss tangent of the adhesive layer falls within this range, satisfactory adhesiveness to the adherend and another layer in contact with the adhesive layer such as the resin layer at room temperature is easily imparted. The peak values of the loss tangent of the adhesive layers (B1) and (B2) may be the same or different in the above range.

The loss tangent (tan δ) at a frequency of 1 Hz of the adhesive layer is obtained from the storage modulus (G') and the loss modulus (G") obtained by dynamic viscoelasticity measurement with temperature variance by the formula tan δ=G"/G'. In dynamic viscoelasticity measurement, a viscoelasticity tester (from TA Instruments Japan, product name: ARES G2) is used. The adhesive layer formed to a thickness of approximately 2 mm as a test piece is placed between the parallel disks with a diameter of 8 mm serving as a measuring section of the tester, and the storage modulus (G') and the loss modulus (G") are measured from −50° C. to 150° C. at a frequency of 1 Hz.

The thickness of the adhesive layer in one or more embodiments may be 5 μm or more and 100 μm or less, 15 μm or more and 80 μm or less, or 25 μm or more and 75 μm or less to achieve both high bonding strength and high conformability to the adherend and another layer adjacent to the adhesive layer, such as the resin layer. The adhesive layers (B1) and (B2) may have the same thickness or different thicknesses in the above range.

(3) Production Method

The adhesive layer in one or more embodiments can be formed by the production method described in the section "5. Production Method" below and/or in the examples, for example, by the direct method in which the adhesive is applied directly to the surface of the resin layer or its precursor layer, or formed by applying the adhesive to the surface of a release liner.

4. Double-Sided Adhesive Tape

The double-sided adhesive tape of one or more embodiments includes at least the foam base, the resin layers (A1) and (A2), and the adhesive layers (B1) and (B2) and may include an optional functional layer such as a light-shielding layer, a light reflective layer, a conductive layer, a thermal conductive layer, and an electromagnetic wave shielding layer, depending on the intended use.

For example, when light-shielding effect is imparted to the double-sided adhesive tape, the double-sided adhesive tape of one or more embodiments may have a light-shielding layer. For example, a light-shielding layer formed from ink containing a colorant such as pigment can be readily used, and a light-shielding layer made from black ink may be used because of high light-shielding effect.

The double-sided adhesive tape of one or more embodiments may have a light reflective layer when light reflectivity of the double-sided adhesive tape is ensured. As the light reflective layer, for example, a layer formed from white ink can be readily used.

When it is desired to impart electromagnetic shielding effect and thermal conductivity in the plane direction to the double-sided adhesive tape, the double-sided adhesive tape of one or more embodiments may have a conductive layer, a thermal conductive layer, and an electromagnetic wave shielding layer. As the conductive layer, the thermal conductive layer, and the electromagnetic wave shielding layer, for example, metal foil, metal mesh, or nonwoven fabric plated with conductive metal may be provided.

The thickness of the functional layer can be set as appropriate depending on the kind of functional layer to fully express its function. For example, the thickness may be in the range of 1 μm to 20 μm, or in the range of 2 μm to 6 μm.

The position of the functional layer in the double-sided adhesive tape of one or more embodiments is, for example, but not limited to, between the resin layer (A1) and the adhesive layer (B1) or between the resin layer (A2) and the adhesive layer (B2) and can be selected as appropriate depending on the usage and function.

The double-sided adhesive tape of one or more embodiments may have a release liner on the surface of each of the adhesive layer (B1) and (B2) on the side opposite to the foam base. Examples of the release liner that can be used include bases such as synthetic resin films such as polyethylene, polypropylene, and polyester films, paper, non-woven fabric, cloth, foam sheets, metal foils, and laminates thereof with release treatment on at least one surface, such as silicone treatment, long-chain alkyl treatment, or fluorine treatment for enhancing releasability from the adhesive.

Among those, it is preferable to use a release liner with silicone release treatment on one surface or both surfaces of a base of high-quality paper or polyester film laminated with polyethylene with a thickness of 10 to 40 μm on both sides.

The double-sided adhesive tape of one or more embodiments can be rolled up well even when the total thickness is large. On the other hand, even when the total thickness is small, a trigger to peel is easily found and the tape is less likely to be torn in peeling, especially when the tape cleaved during disassembly of the article is peeled off. Thus, the double-sided adhesive tape of one or more embodiments can be adjusted as appropriate according to the manner of use. The total thickness of the double-sided adhesive tape of one or more embodiments can be, for example, 1000 μm or less. Among those, 750 μm or less is preferred, and 600 μm or less is further preferred, and 550 μm or less is further preferred in terms of contributing to thickness reduction of the article made by joining by the double-sided adhesive tape of one or more embodiments. The total thickness of the double-sided adhesive tape of one or more embodiments can be 70 μm or more. Among those, 80 μm or more is preferred, and 100 μm or more is more preferred. More specifically, the preferred range of the total thickness of the double-sided adhesive tape of one or more embodiments may be 80 μm or more and 600 μm or less, or 100 μm or more and 550 μm or less. The total thickness of the double-sided adhesive tape does not include the thickness of the release liner.

It is preferable that the double-sided adhesive tape of one or more embodiments has a holding time of 400 minutes or longer in a shear holding strength test performed with a load of 2 kg and at 70° C. A holding time of 800 minutes or longer is more preferred, and a holding time of 1200 minutes or longer is further preferred. The displacement distance 1200 minutes after a load of 2 kg is applied may be 3.0 mm or less, 2.0 mm or less, or 1.0 mm or less. When the holding time under the above conditions is longer than the above time, high shear holding characteristics can be exhibited in a high temperature environment.

The holding time can be measured by "Evaluation Method for Heat Resistance Based on High-Temperature Shear Holding Power" described in the examples below.

5. Production Method

The double-sided adhesive tape of one or more embodiments can be produced by any method that can produce the double-sided adhesive tape having the structure and the physical properties described above. Among those, a production method that can be suitably used includes: a precursor layer (a1) forming step of providing a precursor layer (a1) formed of a composition containing a resin having a hydroxy group and a compound reacting with the hydroxy group directly on one surface of a foam base; a precursor layer (a2) forming step of providing a precursor layer (a2) formed of a composition containing a resin having a hydroxy group and a compound reacting with the hydroxy group directly on the other surface of the foam base; and a reaction step of crosslinking the precursor layer (a1) and the precursor layer (a2) provided on both surfaces of the foam base to form a resin layer (A1) and a resin layer (A2), respectively. The precursor layer (a1) and the precursor layer (a2) may be collectively described as the precursor layer.

In the production method described above, a precursor layer, which is a layer before crosslinking of the resin layer, is provided directly on a surface of the foam base, and a crosslinking reaction of the precursor layer is completed in contact with the surface of the foam base, so that a resin layer exhibiting desired physical properties can be formed, and the interlaminar strength between the foam base and the resin layer can be increased, resulting in a double-sided adhesive tape less likely to develop delamination. This is presumably because in the process of crosslinking reaction of the resin having a hydroxy group and the compound reacting with the hydroxy group in the precursor layer, the hydroxy group and the functional group other than the hydroxy group contained in the foam base react with the hydroxy group and the functional group other than the hydroxy group contained in the precursor layer to form cross-linkage even between the foam base and the precursor layer, thereby increasing the interlaminar strength.

The production method in one or more embodiments includes: a precursor layer (a1) forming step of providing a precursor layer (a1) formed of a composition containing a resin having a hydroxy group and a compound reacting with the hydroxy group directly on one surface of the foam base; and a precursor layer (a2) forming step of providing a precursor layer (a2) formed of a composition containing a resin having a hydroxy group and a compound reacting with the hydroxy group directly on the other surface of the foam base. Here, the precursor layers (a1) and (a2) are the layers before crosslinking of the resin layers (A1) and (A2), respectively. The precursor layer refers to a layer in which the resin having a hydroxy group and the compound reacting with the hydroxy group are in an uncross-linked state, and the hydroxy group and the functional group reacting with the hydroxy group before reaction are present in the layer. The precursor layer is usually a layer in an uncross-linked state, and it is preferable that a crosslinking reaction does not proceed until a crosslinking reaction is caused by the method described below, but crosslinking bonds may be formed partially in the layer unless the crosslinking reaction is not completed.

The method of providing a precursor layer directly on a surface of the foam base is not limited. For example, a preferable method is as follows: a release liner is coated with a composition containing a resin having a hydroxy group and a compound reacting with the hydroxy group (which hereinafter may be referred to as "resin layer-forming composition") to form a precursor layer, and the precursor layer is attached in contact with a surface of the foam base.

Since the precursor layer contains at least the resin having a hydroxy group and the compound reacting with the hydroxy group and thereby has self-adhesive characteristic, the precursor layer can be directly attached and bonded to the foam base without using another bonding agent. When a precursor layer is provided on a surface of the foam base, the precursor layer may be attached to the foam base at room temperature or the precursor layer may be thermally laminated.

When the double-sided adhesive tape of one or more embodiments has another functional layer between the resin layer and the adhesive layer, a precursor layer may be formed by coating one surface of the functional layer, instead of the release liner, with the resin layer-forming composition, and the functional layer having the precursor layer formed thereon may be attached such that the precursor layer is in contact with the surface of the foam base.

The precursor layer may be formed by directly coating a surface of the foam base with the resin layer-forming composition.

The precursor layer (a1) forming step and the precursor layer (a2) forming step may be performed simultaneously or may be performed separately.

The resin layer-forming composition contains at least a resin having a hydroxy group and a compound reacting with the hydroxy group and may contain a thermoplastic resin, a tackifier resin, and other optional components, if necessary. The details and amounts of the resin having a hydroxy group, the compound reacting with the hydroxy group, and other components in the composition can be the same as the details and amounts of the resin having a hydroxy group, the compound reacting with the hydroxy group, and other components in the resin layer described in the section "1. Resin Layer" above.

The resin layer-forming composition may be dissolved or dispersed in a solvent, if necessary, to impart satisfactory coating workability. Examples of the solvent that can be used include organic solvents such as toluene, ethyl acetate, butyl acetate, methyl ethyl ketone, hexane, acetone, cyclohexanone, 3-pentanone, acetonitrile, propionitrile, isobutyronitrile, valeronitrile, dimethyl sulfoxide, and dimethyl formamide, and aqueous solvents such as water.

The thickness of the precursor layer can be set as appropriate so that the thickness after drying is the thickness of the resin layer. The specific thickness range of the precursor layer can be the same as the thickness range of the resin layer described in the section "1. Resin Layer" above. For example, 5 μm or more and 100 μm or less is preferred, 10 μm or more and 50 μm or less is further preferred, and 15 μm or more and 45 μm or less is more preferred.

The production method in one or more embodiments includes a reaction step of crosslinking the precursor layer (a1) and the precursor layer (a2) provided on both surfaces of the foam base to form a resin layer (A1) and a resin layer (A2), respectively, after the precursor layer (a1) forming step and the precursor layer (a2) forming step. In this step, the resin having a hydroxy group and the compound reacting with the hydroxy group in the precursor layer are sufficiently crosslinked to form a resin layer exhibiting predetermined physical properties.

The precursor layer can be crosslinked by any method with which the crosslinking reaction is performed sufficiently. The precursor layer may be crosslinked by an aging process, may be crosslinked by light radiation such as ultraviolet rays, may be crosslinked by heating at a temperature higher than in the aging process, or by a combination of these methods, depending on the composition of the precursor layer. In the precursor layer before this step is performed, it is preferable that a crosslinking reaction does not proceed (uncross-linked), but the crosslinking reaction may be partially produced.

Among those, in the reaction step, it is preferable that the precursor layer is crosslinked by an aging process. Among those, it is preferable to perform an aging process for 2 to 7 days under a temperature environment of 20° C. to 50° C., or for 2 to 7 days under a temperature environment of 23° C. to 45° C. This is because the aging process under the above conditions allows the crosslinking reaction to proceed sufficiently in the precursor layer to form a resin layer with a high degree of crosslinking, and also enhances interlayer adhesiveness between the resin layer and the foam base.

In addition to the precursor layer (a1) forming step and the precursor layer (a2) forming step, and the reaction step described above, the production method in one or more embodiments usually includes: a step of providing an adhesive layer (B1) or an adhesive layer (b1) before crosslinking of the adhesive layer (B1) on a surface of the precursor layer (a1) or the resin layer (A1) on a side opposite to the foam base; and a step of providing an adhesive layer (B2) or an adhesive layer (b2) before crosslinking of the adhesive layer (B2) on a surface of the precursor layer (a2) or the resin layer (A2) on a side opposite to the foam base.

The adhesive layers (B1) and (B2) may or may not have a crosslinked structure, depending on the composition of the adhesive. When the adhesive forming the adhesive layer contains a crosslinking agent, the adhesive layers (b1) and (b2) before crosslinking mean the adhesive layers before the crosslinking reaction is completed by aging or the like, and become the adhesive layers (B1) and (B2) when the crosslinking reaction is completed by aging or the like.

The adhesive layer (B) or the adhesive layer (b) before crosslinking may be provided on the surface of the precursor layer (a) or the resin layer (A) by any method, for example, by a direct method in which an adhesive is directly applied to the surface of the precursor layer or the resin layer, or by an indirect method in which the adhesive layer or the adhesive layer before crosslinking formed by applying an adhesive on the surface of a release liner is transferred to the surface of the precursor layer or the resin layer. When another layer is interposed between the precursor layer or the resin layer and the adhesive layer, the adhesive layer (B) or the adhesive layer (b) before crosslinking may be formed by the above method after another layer is provided on the surface of the precursor layer or the resin layer.

The step of forming the adhesive layer (B) or the adhesive layer (b) before crosslinking may be performed before or after the precursor layer (a1) forming step and the precursor layer (a2) forming step, but preferably performed after the precursor layer (a1) forming step and the precursor layer (a2) forming step. The step of forming the adhesive layer (B) or the adhesive layer (b) before crosslinking may be performed before the reaction step or may be performed after the reaction step. For example, the adhesive layer (B) may be provided on the surface of the precursor layer before the reaction step or may be provided on the surface of the resin layer after the reaction step. The adhesive layer (b) before crosslinking may be provided on the surface of the precursor layer before the reaction step or may be provided on the surface of the resin layer after the reaction step.

The adhesive layer (B) or the adhesive layer (b) before crosslinking may be provided on the surface of the precursor layer (a1) on the side opposite to the foam base or may be provided on the surface of the resin layer (A1) on the side opposite to the foam base after the reaction step. Among those, it is preferable to include a step of providing an adhesive layer (B1) or an adhesive layer (b1) before crosslinking on a surface of the precursor layer (a1) on a side opposite to the foam base and a step of providing an adhesive layer (B2) or an adhesive layer (b2) before crosslinking on a surface of the precursor layer (a2) on a side opposite to the foam base. This is because the reaction process can be performed in a state in which the adhesive layer (B) or the adhesive layer (b) before crosslinking is provided on the precursor layer, so that the interlayer adhesiveness between the resin layer and the adhesive layer can be enhanced.

In particular, it is preferable to perform, before the reaction step, a step of providing an adhesive layer (b1) before crosslinking on a surface of the precursor layer (a1) on a side opposite to the foam base and a step of providing an adhesive layer (b2) before crosslinking on a surface of the precursor layer (a2) on a side opposite to the foam base. When an adhesive layer before crosslinking is provided on a surface of the precursor layer before the reaction step, the reaction also proceeds inside the adhesive layers (b1) and (b2) before crosslinking by the method of crosslinking the precursor layers carried out in the reaction step, so that the adhesive layer (B1) and the adhesive layer (B2) made by crosslinking of the adhesive layer (b1) and the adhesive layer (b2) can be formed in the reaction step. Here, it is preferable that the precursor layer (a1) and the adhesive layer (b1) before crosslinking are in direct contact with each other, and the precursor layer (a2) and the adhesive layer (b2) before crosslinking are in direct contact with each other. Crosslinking reactions can be produced even between the precursor layer (a1) and the adhesive layer (b1) before crosslinking as well as between the precursor layer (a2) and the adhesive layer (b2) before crosslinking, thereby enhancing the interlayer adhesiveness between the resin layer and the adhesive layer and enhancing reworkability and shear holding characteristics.

As a preferred example of the production method in one or more embodiments, the production method at least includes: a precursor layer (a1) forming step of providing a precursor layer (a1) formed of a composition containing a resin having a hydroxy group and a compound reacting with the hydroxy groups directly on one surface of a foam base; a precursor layer (a2) forming step of providing a precursor layer (a2) formed of a composition containing a resin having a hydroxy group and a compound reacting with the hydroxy group directly on the other surface of the foam base; an adhesive layer (b1) forming step of providing an adhesive layer (b1) before crosslinking on a surface of the precursor layer (a1) on a side opposite to the foam base directly or with another layer interposed after the precursor layer (a1) forming step; an adhesive layer (b2) forming step of providing an adhesive layer (b2) before crosslinking on a surface of the precursor layer (a2) on a side opposite to the foam base side directly or with another layer interposed after the precursor layer (a2) forming step; and a reaction step of performing an aging process on an intermediate laminate at least including the precursor layers (a1) and (a2) directly disposed on one surface and the other surface of the foam base, respectively, and the adhesive layers (b1) and (b2) before crosslinking directly provided on the surfaces of the precursor layers (a1) and (a2), respectively, on the sides opposite to the foam base, to form resin layers (A1) and (A2) made by crosslinking of the precursor layers (a1) and (a2), and adhesive layers (B1) and (B2) made by crosslinking of the adhesive layer (b1) and (b2) before crosslinking. With the above production method, the crosslinking reactions of the precursor layers and the adhesive layers can proceed in a batch, and a double-sided adhesive tape with excellent interlayer adhesiveness and shear holding characteristics can be made.

When the double-sided adhesive tape of one or more embodiments has another functional layer between the resin layer and the adhesive layer, the precursor layer may be provided on a surface of the foam base and thereafter the functional layer may be provided on a surface of the precursor layer directly or with the adhesive layer interposed, and the adhesive layer before or after crosslinking may be provided on a surface of the functional layer.

6. Usage

The double-sided adhesive tape of one or more embodiments can be suitably used to produce articles to be used in high-temperature environments as well as room temperature environments and articles prone to be hot, because it has satisfactory shear holding characteristics at high temperatures while exhibiting impact resistance because of the foam base. The double-sided adhesive tape of one or more embodiments is suitably used for bonding parts that must be reused or recycled and for producing articles using such parts, because when the tape is peeled off from the adherend, the edge can be easily picked up to make a trigger to peel, and the tape is less likely to be torn during peeling and tape residue is less likely to be left on the adherend.

The double-sided adhesive tape of one or more embodiments can be suitably used as a double-sided adhesive tape for fixing parts together in various products in industrial application such as automobile, construction material, office automation equipment, and home appliance industries. In addition, the operation efficiency is satisfactory when a large quantity of parts are separated and a large quantity of labels are peeled off during reuse or recycling. Among those, it is preferable to use for fixing two or more parts that make up an electronic device prone to reach high temperatures and in great demand for reuse and recycling. More specifically, suitable applications include fixing parts of small electronic devices, protective panels, image display modules, and touch panels for information displays of small electronic devices, thin batteries, speakers, receivers, piezoelectric elements, printed circuit boards, flexible printed circuit boards (FPCs), digital camera modules, sensors, and other modules, cushioning materials and rubber members of polyurethane and polyolefins, decorative parts, and various members. Particularly suitable applications are fixing thin rigid parts such as protective panels, image display modules, and touch panels for information displays of small electronic devices, and thin batteries.

II. Article

An article of one or more embodiments is an article having two or more adherends joined by the double-sided adhesive tape described in the above section "I. Double-Sided Adhesive Tape". The adherends that constitute the article are not limited and can be selected as appropriate depending on the kind of articles. As the adherends, for example, various parts described in the above section "I. Double-Sided Adhesive Tape, 6. Usage" can be used. Among those, parts of electronic devices are preferred.

III. Method of Disassembling Article

A method of disassembling an article of one or more embodiments is a method of disassembling an article having two or more adherends joined by the double-sided adhesive tape described in the above section "I. Double-Sided Adhesive Tape". The method includes: cleaving the double-sided adhesive tape at the foam base to separate the article into a first adherend including a first laminate having a portion of the foam base, the resin layer (A1), and the adhesive layer (B1), and a second adherend including a second laminate having a portion of the foam base, the resin layer (A2), and the adhesive layer (B2); peeling the first laminate from the first adherend; and peeling the second laminate from the second adherend.

Figure 2A:
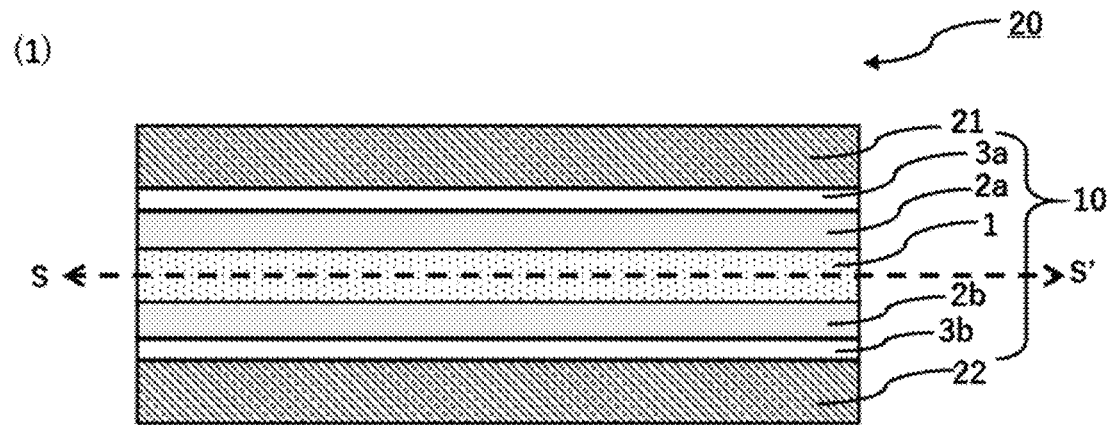
FIGS. 2A-2C are process diagrams illustrating an example of a method of disassembling an article according to one or more embodiments of the present invention.
Figure 2B:
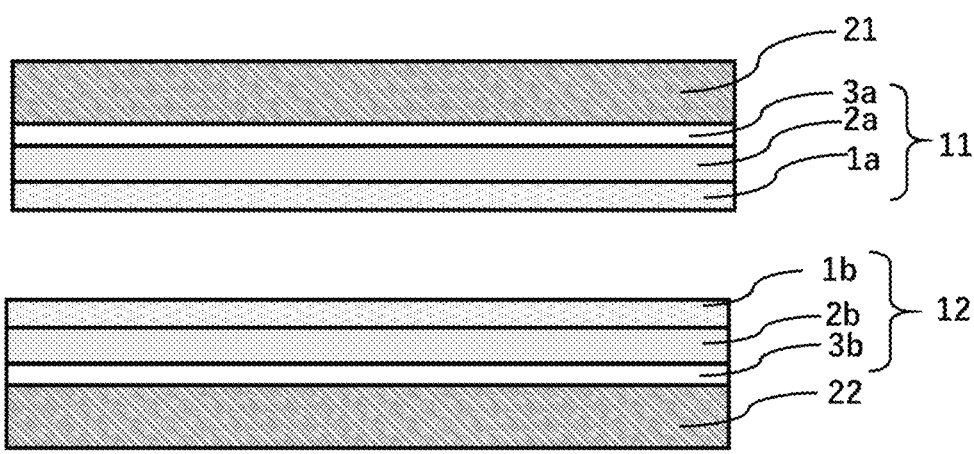
Figure 2C:
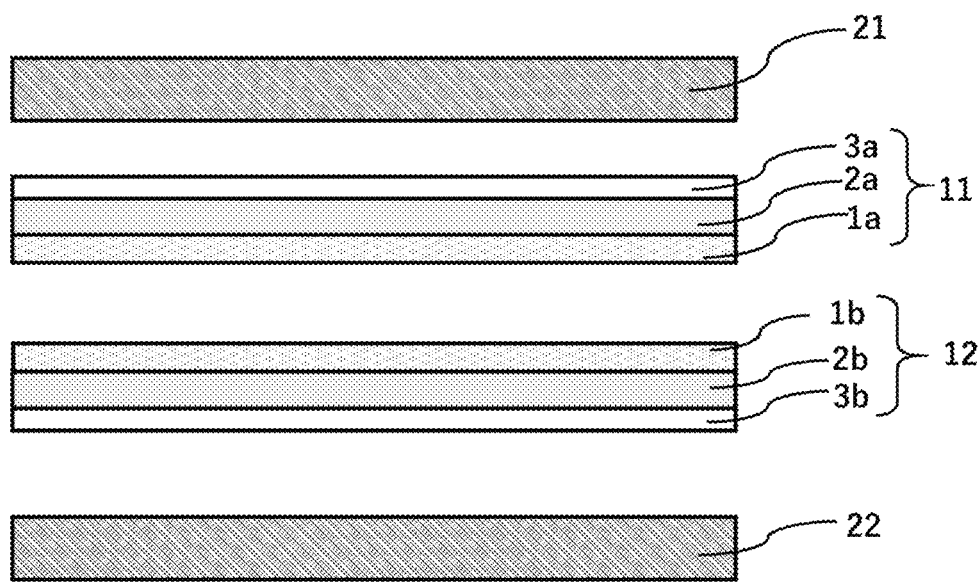

FIGS. 2A-2C are diagrams illustrating an example of the method of disassembling an article of one or more embodiments. First, as illustrated in FIG. 2A, an article 20 made of two or more adherends (a first adherend 21 and a second adherend 22) joined by the double-sided adhesive tape 10 is cleaved along a plane direction S-S' at the foam base 1 of the double-sided adhesive tape 10 and, as illustrated in FIG. 2B, separated into the first adherend 21 with a first laminate 11 and the second adherend 22 with a second laminate 12. The first laminate 11 has a portion of the foam base (reference sign 1*a* in FIGS. 2A-2C), the resin layer (A1) (reference sign 2*a* in FIGS. 2A-2C), and the adhesive layer (B1) (reference sign 3*a* in FIGS. 2A-2C) in this order, and a surface of the first laminate 11 on the adhesive layer (B1) side is attached to the first adherend 21. The second laminate 12 has a portion of the foam base (reference sign 1*b* in FIGS. 2A-2C), the resin layer (A2) (reference sign 2*b* in FIGS. 2A-2C), and the adhesive layer (B2) (reference sign 3*b* in FIGS. 2A-2C) in this order, and a surface of the second laminate 12 on the adhesive layer (B2) side is attached to the second adherend 22.

Then, as illustrated in FIG. 2C, the first laminate 11 is peeled off from the first adherend 21, and the second laminate 12 is peeled off from the second adherend 22. As a specific method of peeling the laminate from the adherend, the first laminate 11 is peeled off from the first adherend 21 by picking up and pulling the edge of the first laminate 11, specifically the edge of at least the resin layer (A1) of the first laminate 11. The laminate 12 is peeled off from the second adherend 22 by picking up and pulling the edge of the second laminate 12, specifically the edge of at least the resin layer (A2) of the second laminate 12. Thus, the article can be easily disassembled into the first adherend 21 and the second adherend 22 from which the double-sided adhesive tape 10 has been removed.

In the method of disassembling an article of one or more embodiments, the double-sided adhesive tape having predetermined resin layers on both surfaces of the foam base is used. Therefore, when the double-sided adhesive tape is cleaved at the foam base and the article is separated into two pieces, namely, the first adherend in which the first laminate that is a portion of the double-sided adhesive tape is left and the second adherend in which the second laminate is left, and thereafter the laminates are peeled off from the adherends, delamination is less likely to occur between the foam base and the resin layer or between the resin layer and the adhesive layer, and each laminate can be easily peeled off from the adherend. In addition, since the resin layer exhibits a tensile modulus in a predetermined range, toughness and elongation are well balanced. Therefore, the edge of the laminate is easily picked up to facilitate peeling when the laminate is peeled off from the adherend. In addition, the tape is less likely to be torn during peeling, and tape residue on the adherend due to delamination of the laminate can be prevented. In this way, since the double-sided adhesive tape has excellent reworkability, the ease of disassembly of articles and the reusability of parts can be further enhanced.

The details of the double-sided adhesive tape for joining two or more adherends used in the method of disassembling an article of one or more embodiments are the same as those already described in the above section "I. Double-Sided Adhesive Tape" and will not be further elaborated here.

The two or more adherends (the first adherend and the second adherend) joined by the double-sided adhesive tape in the method of disassembling an article of one or more embodiments may be any members that constitute an article and can be selected as appropriate. For example, examples of rigid adherends include metal adherends such as metal sheets, metal housings, and metal covers, glass sheets, and plastic sheets. Among those, members that must be reused or recycled are preferred. The first adherend and the second adherend may be the same kind of adherends or different kinds of adherends.

In the method of disassembling an article of one or more embodiments, first, an article having two or more adherends joined by the double-sided adhesive tape of one or more embodiments is cleaved at the foam base of the double-sided adhesive tape, so that the article is separated into a first adherend including a first laminate having a portion of the foam base, the resin layer (A1), and the adhesive layer (B1), and a second adherend including a second laminate having a portion of the foam base, the resin layer (A2), and the adhesive layer (B2). These operations are defined as a disassembly step 1 in the method of disassembling an article of one or more embodiments.

The cleaving method in the disassembly step 1 may be any method that can cleave the foam base in the plane direction and separate the article into two pieces. For example, one side of the article in the thickness direction may be fixed, and the foam base may be sliced in the plane direction at a desired position in the thickness direction. With this step, the laminate left on the adherend can include the resin layer (A1) or (A2). A common slicer can be used to cleave the foam base.

The position of cleavage in the thickness direction of the foam base is not limited and may be, for example, the center in the thickness direction of the foam base or near one of the resin layers. The thickness of the foam base after cleavage in the first laminate and the second laminate can be set as appropriate according to the cleavage position.

In the disassembly step 1, the article is separated into the first adherend with the first laminate and the second adherend with the second laminate. The first laminate has a portion of the foam base, the resin layer (A1), and the adhesive layer (B1) in this order, and a surface of the first laminate on the adhesive layer (B1) side is attached to the first adherend. The second laminate has a portion of the foam base, the resin layer (A2), and the adhesive layer (B2) in this order, and a surface of the second laminate on the adhesive layer (B2) side is attached to the second adherend.

In the method of disassembling an article of one or more embodiments, secondly, the first laminate is peeled off from the first adherend, and the second laminate is peeled off from the second adherend. These operations are defined as a disassembly step 2 in the method of disassembling an article of one or more embodiments.

As the method of peeling the first laminate from the first adherend in the disassembly step 2, the first laminate can be peeled off from the first adherend by picking up and pulling the edge of the first laminate, more specifically the edge of at least the resin layer (A1) of the first laminate. Similarly, as the method of peeling the second laminate from the second adherend, the second laminate can be peeled off from the second adherend by picking up and pulling the edge of the second laminate, more specifically the edge of at least the resin layer (A2) of the second laminate. In the method of disassembling an article of one or more embodiments, even when the laminate left on each adherend after separation is thin, the edge of the laminate can be easily picked up to make a trigger to peel in peeling, because the laminate includes a predetermined resin layer. In addition, the laminate can be peeled off easily and readily because it is less likely to be torn during peeling and glue reside is less likely to be left. The method of picking up the edge of the laminate is not limited. For example, common methods such as scraping with fingernails can be used.

The present disclosure is not limited to the foregoing embodiments. The foregoing embodiments are illustrative, and any embodiment that has substantially the same configuration as the technical concept described in the claims of the present disclosure and achieves similar effects is included in the technical scope of the present disclosure.

EXAMPLES

Although one or more embodiments of the present invention will be described more specifically with examples and comparative examples below, one or more embodiments of the present invention is not intended to be limited by the following examples.

Preparation Examples

The resin layer-forming compositions and the adhesives used in examples and comparative examples were prepared by the following methods.
1. Preparation of Resin Layer-Forming Composition
Preparation of Resin Layer-Forming Composition (P-1)

A resin layer-forming composition (P-1) was produced by blending 100 parts by mass of a polyester resin having a hydroxy group at a terminal (Nichigo-POLYESTER LP-035S50TO from Mitsubishi Chemical Corporation, solid content 50%, average molecular weight: 16000, glass transition temperature: 20° C., hydroxy group value: 2 to 8), 0.1 parts by mass of ORGATIX ZC-700 (organic zirconium compound from Matsumoto Fine Chemical Co., Ltd.) as a crosslinking reaction accelerator, and 10.3 parts by mass of an adduct of tolylene diisocyanate and trimethylolpropane (BURNOCK D-40 from DIC Corporation, isocyanate-based crosslinking agent, isocyanate group content 7% by mass, solid content 40% by mass, hereinafter referred to as "D-40") as a crosslinking agent.
Preparation of Resin Layer-Forming Composition (P-3)

A resin layer-forming composition (P-3) was produced in the same way as the preparation of the resin layer-forming composition (P-1), except that the amount of D-40 was changed to 7 parts by mass.
Preparation of Resin Layer-Forming Composition (P-4)

A resin layer-forming composition (P-4) was produced in the same way as the preparation of the resin layer-forming composition (P-1), except that the amount of D-40 was changed to 5 parts by mass.
Preparation of Resin Layer-Forming Composition (P-5)

A resin layer-forming composition (P-5) was produced by stirring 100 parts by mass of a thermoplastic elastomer resin (Quintac 3280 from Zeon Corporation) and 186 parts by mass of toluene.

Preparation of Resin Layer-Forming Composition (P-6)

A resin layer-forming composition (P-6) was produced in the same way as the preparation of the resin layer-forming composition (P-5), except that the thermoplastic elastomer resin was changed to Quintac 3270 (from Zeon Corporation).
Preparation of Resin Layer-Forming Composition (P-7)

A resin layer-forming composition (P-7) was produced by stirring 100 parts by mass of an acrylic block copolymer (KURARITY LA3320 from Kuraray Co., Ltd.) and 186 parts by mass of ethyl acetate.
Preparation of Resin Layer-Forming Composition (P-8)

A resin layer-forming composition (P-8) was produced by stirring 100 parts by mass of a styrenic thermoplastic resin (SEPTON 4033 from Kuraray Co., Ltd.) and 355 parts by mass of toluene.
2. Preparation of Adhesive
Preparation of Adhesive (P-2)

In a reaction vessel equipped with a stirrer, a reflux condenser, a nitrogen inlet tube, and a thermometer, 79.9 parts by mass of n-butyl acrylate, 6 parts by mass of 2-ethylhexyl acrylate, 10 parts by mass of cyclohexyl acrylate, 4 parts by mass of acrylic acid, 0.1 parts by mass of 4-hydroxybutyl acrylate, and 200 parts by mass of ethyl acetate were charged, and nitrogen bubbling was performed with stirring at room temperature for one hour to produce a mixture. Then, 2 parts by mass of a solution of 2,2'-azobis (2-methylbutyronitrile) (solid content 1.0% by mass) dissolved in advance in ethyl acetate was added to the mixture, and the mixture was held at 72° C. for four hours with stirring and then held at 75° C. for five hours. Then, the resulting mixture was diluted with ethyl acetate and filtered through a 200 mesh wire cloth to yield an acrylic copolymer (A-1) solution (solid content concentration 26%) with a weight average molecular weight of 1,060,000 and an average carbon atom number of saturated hydrocarbon group of the alkyl acrylate monomer of 4.4. an adhesive (P-2) was produced by blending 100 parts by mass of the acrylic copolymer (A-1) solution with 1.0 parts by mass of D-40 as a crosslinking agent.

Example 1

A double-sided adhesive tape was produced by the following procedure.
Preparation of Precursor Layers (a1) and (a2)

A release treated surface of a release liner (a 75 μm thick polyethylene terephthalate film with release treatment on one side) was coated with the resin layer-forming composition (P-1) so that the thickness after drying was 30 μm, and the coating was dried at 85° C. for four minutes to produce precursor layers (a1) and (a2) that are resin layers before crosslinking. The thickness of the precursor layer is the same as the thickness of the resin layer produced by crosslinking the precursor layer.
Preparation of Adhesive Layers (b1) and (b2) Before Crosslinking A release treated surface of a release liner (a 75 μm thick polyethylene terephthalate film with release treatment on one side) was coated with the adhesive (P-2) so that the thickness after drying was 25 μm, and the coating was dried at 85° C. for three minutes to produce adhesive layers (b1) and (b2) before crosslinking.
Preparation of Double-Sided Adhesive Tape The precursor layer a1 and the precursor layer a2 were attached to the front surface and the back surface, respectively, of a 300 μm thick black polyolefin foam (h-1) (interlaminar strength 15N/cm, apparent density 0.20 g/cm³, compressive strength at 25% 90 kPa, from SEKISUI CHEMICAL CO., LTD., surface-treated by corona treatment to adjust the wetting index to 54 mN/m) and laminated with a roll at 90° C. and a linear pressure of 5 kg/cm to produce an intermediate layer (N-1) having a laminated structure of precursor layer (a1)/foam (h-1)/precursor layer (a2).

Then, the adhesive layer (b1) and the adhesive layer (b2) were attached to the surface of the precursor layer (a1) and the surface of the precursor layer (a2), respectively, of the intermediate layer (N-1) and laminated with a roll at 90° C. and a linear pressure of 5 kg/cm to produce an intermediate laminate having a laminated structure of adhesive layer (b1)/precursor layer (a1)/foam (h-1)/precursor layer (a2)/adhesive layer (b2). Subsequently, the precursor layers (a1) and (a2) and the adhesive layers (b1) and (b2) were crosslinked by aging the intermediate laminate for 120 hours at 40° C. to produce a double-sided adhesive tape (T-1) with a thickness of 410 μm, having a laminated structure of adhesive layer (B1)/resin layer (A1)/foam (h-1)/resin layer (A2)/adhesive layer (B2).

Example 2

A double-sided adhesive tape (T-2) with a thickness of 440 μm was produced in the same way as in Example 1, except that the thicknesses of the precursor layers (a1) and (a2) were changed to 45 μm.

Example 3

A double-sided adhesive tape (T-3) with a thickness of 380 μm was produced in the same way as in Example 1, except that the thicknesses of the precursor layers (a1) and (a2) were changed to 15 μm.

Example 4

A double-sided adhesive tape (T-4) with a thickness of 410 μm was produced in the same way as in Example 1, except that the resin layer-forming composition (P-3) was used in place of the resin layer-forming composition (P-1) in preparation of the precursor layers.

Example 5

A double-sided adhesive tape (T-5) with a thickness of 380 μm was produced in the same way as in Example 3, except that the resin layer-forming composition (P-3) was used in place of the resin layer-forming composition (P-1) in preparation of the precursor layers.

Comparative Example 1

A double-sided adhesive tape (T-6) with a thickness of 410 μm was produced in the same way as in Example 1, except that the resin layer-forming composition (P-4) was used in place of the resin layer-forming composition (P-1) in preparation of the precursor layers.

Comparative Example 2

A double-sided adhesive tape (T-7) with a thickness of 380 μm was produced in the same way as in Example 3, except that the resin layer-forming composition (P-4) was used in place of the resin layer-forming composition (P-1) in preparation of the precursor layers.

Comparative Example 3

A double-sided adhesive tape (T-8) with a thickness of 410 μm was produced in the same way as in Example 1, except that the resin layer-forming composition (P-5) was used in place of the resin layer-forming composition (P-1) in preparation of the precursor layers.

Comparative Example 4

A double-sided adhesive tape (T-9) with a thickness of 410 μm was produced in the same way as in Comparative Example 3, except that the resin layer-forming composition (P-6) was used in place of the resin layer-forming composition (P-5) in preparation of the precursor layers.

Comparative Example 5

A double-sided adhesive tape (T-10) with a thickness of 410 μm was produced in the same way as in Comparative Example 3, except that the resin layer-forming composition (P-7) was used in place of the resin layer-forming composition (P-5) in preparation of the precursor layers.

Comparative Example 6

A double-sided adhesive tape (T-11) with a thickness of 410 μm was produced in the same way as in Comparative Example 3, except that the resin layer-forming composition (P-8) was used in place of the resin layer-forming composition (P-5) in preparation of the precursor layers.

Comparative Example 7

A urethane bonding agent described below was applied to both surfaces of a black polyolefin foam (h-1) and dried, and thereafter resin films made of polyethylene terephthalate (6 μm thick, Lumirror 6CF53 from Toray Industries, Inc.) were affixed as resin layers to both surfaces to produce an intermediate layer (N-2) having the resin films bonded to both surfaces of the foam base with a 4 μm thick urethane bonding agent layer interposed. The urethane bonding agent is a two-component solvent-based urethane bonding agent containing a polyether urethane resin having a hydroxy group and an isocyanate curing agent.

Then, the adhesive layer (b1) and the adhesive layer (b2) prepared in "Preparation of adhesive Layers (b1) and (b2) Before Crosslinking" in Example 1 were attached to the front surface and the back surface, respectively, of the intermediate layer (N-2) and laminated with a roll at 90° C. and a linear pressure of 5 kg/cm and aged for 120 hours at 40° C. to produce a double-sided adhesive tape (T-12) with a thickness of 370 μm, having a laminated structure of adhesive layer (B1)/PET resin film/urethane bonding agent layer/foam (h-1)/urethane bonding agent layer/PET resin film/adhesive layer (B2).

Evaluation

The double-sided adhesive tapes obtained in Examples and Comparative Examples, and the resin layers in Examples and Comparative Examples were evaluated as follows. The results of evaluation are listed in the tables below.

Gel Fraction of Resin Layer

A release treated surface of a release liner (a 75 μm thick polyethylene terephthalate film with release treatment on one side) was coated with the resin layer-forming composition (P-1, P-3 to P-8) prepared in Examples and Comparative Examples so that the thickness after drying was 50 μm to produce a precursor layer, which was then dried at 85° C. for four minutes and aged at 40° C. for 120 hours to form a resin layer.

The resin layer formed using the resin layer-forming composition (P-1, P-3 to P-8) and the resin film used in Comparative Example 7 were each cut into a 50 mm square as a sample, and the mass (G1) of the samples was measured. The sample was then immersed in toluene solution at 23° C. for 24 hours, and the toluene-insoluble portion of the sample after immersion was separated by filtration through a 300 mesh wire mesh. The mass of the residue (G2) after drying at 110° C. for one hour was measured, and the gel fraction of the resin layer was determined according to the following formula.

Gel fraction (% by mass)=($G2/G1$)×100

Measurement Method for Tensile Modulus, Tensile Elongation at Break, and Tensile Stress at Break of Resin Layer A release treated surface of a release liner (a 75 μm thick polyethylene terephthalate film with release treatment on one side) was coated with the resin layer-forming composition (P-1, P-3 to P-8) prepared in Examples and Comparative Examples so that the thickness after drying was 30 μm to form a precursor layer, which was then dried at 85° C. for four minutes and aged at 40° C. for 120 hours to form a resin layer. Then, the resin layer formed using the resin layer-forming composition (P-1, P-3 to 8) and the resin film used in Comparative Example 7 were each into a test piece with a gauge length of 2 cm and a width of 1 cm. For the test piece, tensile measurement was performed under a measurement environment at a temperature of 23° C. and a humidity of 50% using a tensile tester at a pulling speed of 100 mm/min to obtain a stress-strain curve (called S-S curve) of the test piece (resin layer). The tensile elongation at break of the resin layer was calculated from the elongation at break of the test piece using the following formula (1).

Tensile elongation at break [%]={(length of test piece at break−initial length of test piece)/initial length of test piece}×100   formula (1)

The tensile stress at break of the resin layer was calculated from the obtained stress-strain curve and the strength at break per unit area. The tensile modulus of the resin layer was calculated from the slope of the tensile strength at 1 to 3% elongation.

Evaluation Method for Ease of Rolling

One of the release liners on the resulting double-sided adhesive tape was stripped off, and the double-sided adhesive tape was wrapped around a 3-inch diameter core with the exposed adhesive layer side facing inward. The presence/absence of wrinkles was visually checked to make an evaluation according to the following evaluation criteria.

A: No wrinkles appeared.
C: Wrinkles appeared.

Evaluation Method for Adhesiveness

One of the release liners on the resulting double-sided adhesive tape was stripped off, and the double-sided adhesive tape was lined with a 25 μm polyethylene terephthalate film (which may be hereinafter referred to as "lining material") and cut into a width of 10 mm and a length of 100 mm. Then, the release liner on the other side was stripped off, the exposed surface of the adhesive layer was affixed to a stainless steel plate. A 2 kg roller was moved back and forth once on the upper surface (the surface lined with the polyethylene terephthalate film) of the double-sided adhesive sheet, and then they were left at a temperature of 23° C. and a relative humidity of 50% RH for 24 hours to prepare a test piece 1 in which the double-sided adhesive tape and the stainless steel plate were bonded to each other. Subsequently, the lining material was grabbed and pulled up in a direction at 90 degrees at a speed of 1 m/s. The location of fracture was checked to make an evaluation according to the following evaluation criteria.

A: Fracture occurred between layers of the foam.
C: Fracture occurred between the foam and the resin layer (A1) or the resin layer (A2).

Evaluation Method for Ease of Picking Up in Rework Test

Figure 3A:
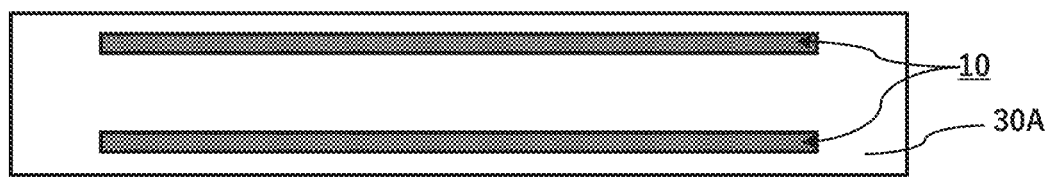
FIGS. 3A and 3B are a schematic diagram illustrating a structure used in evaluation of ease of picking up in a rework test.
Figure 3B:
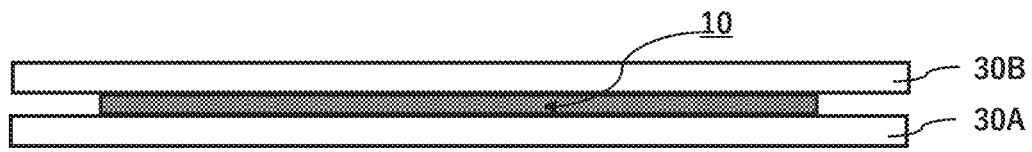

The resulting double-sided adhesive tape was cut into a width of 2 mm and a length of 150 mm. One of the release liners was stripped off, and the cut double-sided adhesive tape 10 was affixed to a 25 mm wide and 200 mm long polycarbonate plate 30A at two places in a planar view, as illustrated in FIG. 3A. Two double-sided adhesive tapes 10 were affixed each at a position 2 mm away from the long side of the polycarbonate plate 30A in a planar view so that the longitudinal direction of the double-sided adhesive tapes was parallel to the long side of the polycarbonate plate 30A. Subsequently, the other release liner on the double-sided adhesive tape 10 affixed to the polycarbonate plate 30A was stripped off, and a 25 mm wide and 200 mm long polycarbonate plate 30B was affixed to the exposed adhesive layer such that the double-sided adhesive tape 10 was sandwiched. As illustrated in FIG. 3B, a structure made of two polycarbonate plates 30A and 30B joined together by the double-sided adhesive tape 10 at two places was obtained. Subsequently, a press machine was used to pressurize the structure for 10 seconds at a pressure of 20 N/cm$^2$, and the structure was left at 60° C. for six hours and then left at a temperature of 23° C. and a relative humidity of 50% RH for one hour.

Then, a cutter was inserted into the gap between the polycarbonate plates A and B of the structure, and the double-sided adhesive tape was cut and cleaved in the plane direction at the foam base, so that the structure was separated and disassembled to produce a test piece 2 in which a laminate of the adhesive layer/the resin layer/a portion of the foam base (hereinafter referred to as "tape residue") was bonded to each of the polycarbonate plates 30A and 30B. Subsequently, the edge of the laminate was scraped up with a fingernail to create a starting point for pulling off the laminate left on the polycarbonate plate. The ease of picking up the tape residue at the start of peeling was evaluated according to the following evaluation criteria.

A: The number of times of scraping up with a fingernail to create a starting point was 0 to 2 times.
B: The number of times of scraping up with a fingernail to create a starting point was 3 to 10 times.
C: The number of times of scraping up with a fingernail to create a starting point was 10 times or more.

Evaluation Method for Tearing Resistance in Rework Test

For the test piece 2 in which the starting point for pulling off the tape residue had already been prepared, the starting point of one tape residue left on the polycarbonate plate was grabbed with fingers and pulled in a direction at 90 degrees at a speed of 300 mm/min, and the tape residue was peeled off from the polycarbonate plate. Tearing resistance was evaluated according to the following evaluation criteria.

A: The number of times of tearing before one residue was completely stripped off was 0 to 2 times.
B: The number of times of tearing before one residue was completely stripped off was 3 to 5 times.
C: The number of times of tearing before one residue was completely stripped off was 6 times or more.

Evaluation Method for Glue Residue in Rework Test

In the polycarbonate plate after the evaluation of tearing resistance, the percentage of adhesive left on a portion having the tape residue completely stripped off was calculated by "(area with adhesive left/original tape affixed area)× 100. Glue residue was evaluated according to the following evaluation criteria.
A: The percentage of the area with adhesive left after stripping was less than 10%.
B: The percentage of the area with adhesive left after stripping was 10% or more and less than 30%.
C: The percentage of the area with adhesive left after stripping was 30% or more.

Evaluation Method for Heat Resistance Based on High-Temperature Shear Holding Power The release liner on one side of the double-sided adhesive tape was stripped off, and the exposed surface of the adhesive layer was lined with a 100 μm thick aluminum foil to make a test piece with a width of 20 mm and a length of 100 mm. The release liner on the other side of the test piece was stripped off, and the test piece was affixed to a stainless steel plate having a hairline finish with sandpaper #280 so that the affixed area was 20 mm wide and 20 mm long, and pressurized with a 2.0 kg roller with one round trip. After the test piece was left for one hour at a temperature of 23° C. and a relative humidity of 50% RH, a load of 2 kg was applied in the shear direction at 70° C., and the time to drop was measured. For the test pieces with which the time to drop was longer than 1200 minutes, the displacement distance was measured 1200 minutes after the start of loading.

TABLE 1

| | | Example 1 | Example 2 | Example 3 | Example 4 | Example 5 |
|---|---|---|---|---|---|---|
| | Double-sided adhesive tape | T-1 | T-2 | T-3 | T-4 | T-5 |
| Resin layer (A1), (A2) | Gel fraction [%] | 75 | 75 | 75 | 54 | 54 |
| | Thickness [μm] | 30 | 45 | 15 | 30 | 15 |
| | Tensile modulus [MPa] | 104.9 | 104.9 | 104.9 | 59.3 | 59.3 |
| | Tensile stress at break [MPa] | 55.0 | 55.0 | 55.0 | 17.9 | 17.9 |
| | Tensile elongation at break [%] | 620 | 620 | 620 | 550 | 550 |
| | Ease of Rolling | A | A | A | A | A |
| | Base adhesiveness | A | A | A | A | A |
| | Ease of picking up | A | A | B | A | B |
| | Tearing resistance | A | A | A | A | A |
| | Glue residue | A | A | A | A | A |
| Heat resistance (high-temperature shear holding power) | Time to drop [min] | 1200< | 1200< | 1200< | 1200< | 1200< |
| | Displacement distance [mm] 1200 min after start of loading | 0.7 | 0.7 | 0.7 | 1.0 | 1.0 |

TABLE 2

| | | Comparative Example 1 | Comparative Example 2 | Comparative Example 3 | Comparative Example 4 | Comparative Example 5 | Comparative Example 6 | Comparative Example 7 |
|---|---|---|---|---|---|---|---|---|
| | Double-sided adhesive tape | T-6 | T-7 | T-8 | T-9 | T-10 | T-11 | T-12 |
| Resin layer (A1), (A2) | Gel fraction [%] | 38 | 38 | 0 | 0 | 0 | 0 | 99 |
| | Thickness [μm] | 15 | 30 | 30 | 30 | 30 | 30 | 6 |
| | Tensile modulus [MPa] | 43.7 | 43.7 | 4.4 | 4.0 | 1.1 | 67.1 | 2500 |
| | Tensile stress at break [MPa] | 13.6 | 13.6 | 24.0 | 4.5 | 8.6 | 43.0 | 220 |
| | Tensile elongation at break [%] | 460 | 460 | 1230 | 1700 | 870 | 480 | 67 |
| | Ease of Rolling | A | A | A | A | A | A | C |
| | Base adhesiveness | A | A | A | A | A | C | A |
| | Ease of picking up | B | B | B | C | B | B | A |
| | Tearing resistance | B | A | C | C | C | A | A |
| | Glue residue | A | A | B | C | C | A | A |
| Heat (high-temperature shear holding power) resistance | Time to drop [min] | 360 | 300 | 3 | 5 | 5 | 10 | 1200< |
| | Displacement distance [mm] 1200 min after start of loading | (Drop) | (Drop) | (Drop) | (Drop) | (Drop) | (Drop) | 0.7 |

The double-sided adhesive tape in Examples had excellent physical properties in all of rollability (ease of rolling and base adhesiveness), reworkability (ease of picking up, tearing resistance, and glue residue) when peeled off from the adherend after disassembly of the structure, and heat resistance (high-temperature shear holding power), and achieved those physical properties at the same time. On the other hand, in Comparative Examples 1 to 2 in which the resin layers (A1) and (A2) are formed of a crosslinked product of a composition containing a resin having a hydroxy group and a compound reacting with the hydroxy group but do not fall in a predetermined range of storage modulus, and in Comparative Examples 3 to 7 in which neither of the resin layers (A1) and (A2) was formed of a crosslinked product of a composition containing a resin having a hydroxy group and a compound reacting with the hydroxy group, the double-sided adhesive tape failed to achieve rollability, reworkability, and heat resistance at the same time.

In particular, it was demonstrated that if the tensile modulus of the resin layer was too small, ease of picking up, tearing resistance, and high-temperature shear holding power were inferior. Although not listed in the tables, the above evaluations were performed for a double-sided adhesive tape (Comparative Example 8, resin layer thickness: 30 μm, tensile storage modulus of resin layer: 23.5 MPa) produced in the same way as in Example 1 using a resin layer-forming composition (P-9) prepared by changing the amount of D-40 in the preparation of the resin layer-forming composition (P-1) to 2 parts by mass. Then, the tearing resistance was C, and in the heat resistance evaluation, the time to drop was shorter than 100 minutes. It was also demonstrated that when the storage modulus of the resin layer was within the predetermined range but the resin layer was not formed of the predetermined crosslinked product, base adhesiveness and/or heat resistance was inferior. Furthermore, the results of Comparative Example 7 demonstrated that when the thickness of the resin layer was small but the tensile modulus was too large, ease of rolling (rollability) was not achieved. The base adhesiveness in Comparative Example 7 was attributable to that the PET film was bonded to the foam base by a bonding agent. The PET film alone was unable to bond to the foam base and therefore the base adhesiveness was C.

Although the disclosure has been described with respect to only a limited number of embodiments, those skilled in the art, having benefit of this disclosure, will appreciate that various other embodiments may be devised without departing from the scope of the present disclosure. Accordingly, the scope of the invention should be limited only by the attached claims.

What is claimed is:

1. A double-sided adhesive tape comprising:
    a foam base;
    a resin layer (A1) disposed in direct contact with one surface of the foam base, and an adhesive layer (B1) disposed on the resin layer (A1) on a side opposite to the foam base; and
    a resin layer (A2) disposed in direct contact with another surface of the foam base, and an adhesive layer (B2) disposed on the resin layer (A2) on a side opposite to the foam base,
    wherein:
        the resin layer (A1) and the resin layer (A2) are each formed of a crosslinked product of a composition containing a resin having a hydroxy group and a compound reacting with the hydroxy group,
        a tensile modulus of each of the resin layer (A1) and the resin layer (A2) is 50 MPa or more and 1000 MPa or less, and
        a hydroxy group value of the resin having the hydroxy group is 1 mg KOH/g or more and 30 mg KOH/g or less.

2. The double-sided adhesive tape according to claim 1, wherein a thickness of each of the resin layer (A1) and the resin layer (A2) is 100 μm or less.

3. The double-sided adhesive tape according to claim 1, wherein the resin having a hydroxy group is a polyol resin of at least one selected from the group consisting of a polyester resin having a hydroxy group, an acrylic resin having a hydroxy group, and a urethane resin having a hydroxy group.

4. The double-sided adhesive tape according to claim 1, wherein the compound reacting with the hydroxy group is an isocyanate compound.

5. The double-sided adhesive tape according to claim 1, wherein the foam base is a polyolefin foam.

6. The double-sided adhesive tape according to claim 1, wherein a total thickness is 1000 μm or less.

7. An electronic device, wherein two or more parts that constitute the electronic device are fixed with the double-sided adhesive tape according to claim 1.

8. An article having two or more adherends joined by the double-sided adhesive tape according to claim 1.

* * * * *